US010769826B2

(12) United States Patent
Azmoon et al.

(10) Patent No.: US 10,769,826 B2
(45) Date of Patent: Sep. 8, 2020

(54) VISUAL TASK BOARD VISUALIZATION

(71) Applicant: ServiceNow, Inc., Santa Clara, CA (US)

(72) Inventors: Troy Azmoon, Carlsbad, CA (US); Todd Bashor, Del Mar, CA (US)

(73) Assignee: ServiceNow, Inc., Santa Clara, CA (US)

(*) Notice: Subject to any disclaimer, the term of this patent is extended or adjusted under 35 U.S.C. 154(b) by 381 days.

(21) Appl. No.: 14/984,138

(22) Filed: Dec. 30, 2015

(65) Prior Publication Data

US 2016/0188134 A1 Jun. 30, 2016

Related U.S. Application Data

(60) Provisional application No. 62/098,456, filed on Dec. 31, 2014.

(51) Int. Cl.
*G06F 3/048* (2013.01)
*G06T 11/20* (2006.01)
*G06Q 10/10* (2012.01)
*G06Q 10/06* (2012.01)

(52) U.S. Cl.
CPC .......... *G06T 11/206* (2013.01); *G06Q 10/06* (2013.01); *G06Q 10/103* (2013.01)

(58) Field of Classification Search
CPC ........ G06T 11/206; G06Q 10/06; G06F 3/048
See application file for complete search history.

(56) References Cited

U.S. PATENT DOCUMENTS

| 3,141,243 A | 7/1964 | Chapman et al. |
| 3,371,321 A | 2/1968 | Adams |
| 5,577,186 A | 11/1996 | Mann, II et al. |
| 6,612,842 B2 | 9/2003 | Wen et al. |

(Continued)

FOREIGN PATENT DOCUMENTS

CN 101170542 B 4/2008

OTHER PUBLICATIONS http://leankit.com/product-tour, "Stay informed with instant visibility into your team's work and process." Downloaded Dec. 17, 2014. Web site contains videos.

(Continued)

*Primary Examiner* — Mahelet Shiberou
(74) *Attorney, Agent, or Firm* — Fletcher Yoder PC

(57) ABSTRACT

Systems, apparatuses, and methods for displaying a visual task board are disclosed. This may comprise identifying a visual task board information set that comprises a plurality of records, each record comprising at least one information element from a plurality of information elements from the information set, identifying an information element from the plurality of information elements as a first visualization metric, identifying a first aggregation mode based on the first visualization metric, generating a first graph based on the first aggregation mode, generating a first plurality lanes based on the first visualization metric, generating a first card representing a first record from the plurality of records, including the first card in a first lane from the first plurality of lanes, generating, by a processor in response to instructions stored in a non-transitory computer readable medium, an output for display, the output including the first graph or the first lane.

32 Claims, 19 Drawing Sheets

(56) References Cited

U.S. PATENT DOCUMENTS

| | | | |
|---|---|---|---|
| 6,639,611 B1* | 10/2003 | Leduc | G06F 40/177 |
| | | | 715/764 |
| 6,692,256 B2 | 2/2004 | Chan et al. | |
| 6,909,874 B2 | 6/2005 | Holtz et al. | |
| 6,970,844 B1 | 11/2005 | Bierenbaum | |
| 7,062,220 B2 | 6/2006 | Haynes et al. | |
| 7,065,512 B1 | 6/2006 | Bertrand et al. | |
| 7,101,753 B2 | 9/2006 | Kamiyama et al. | |
| 7,383,310 B1 | 6/2008 | Lyle et al. | |
| 7,774,220 B2 | 8/2010 | Sullivan et al. | |
| 7,878,808 B1 | 2/2011 | Stumm et al. | |
| 8,060,466 B1 | 11/2011 | Round et al. | |
| 8,170,901 B2 | 5/2012 | Shukla et al. | |
| 8,190,999 B2 | 5/2012 | Chen et al. | |
| 8,280,925 B2 | 10/2012 | Arthursson et al. | |
| 8,370,803 B1 | 2/2013 | Holler et al. | |
| RE44,188 E | 4/2013 | Adra | |
| 8,490,868 B1 | 7/2013 | Kropf et al. | |
| 8,606,611 B1 | 12/2013 | Fedorov et al. | |
| 8,645,852 B2 | 2/2014 | Kordun | |
| 8,683,362 B2 | 3/2014 | Shiplacoff et al. | |
| 8,701,078 B1 | 4/2014 | Holler et al. | |
| 8,719,174 B2 | 5/2014 | Peters et al. | |
| 10,157,173 B2* | 12/2018 | Villani | G06F 40/103 |
| 2003/0014314 A1 | 1/2003 | Griep et al. | |
| 2004/0117046 A1 | 6/2004 | Colle et al. | |
| 2005/0044187 A1 | 2/2005 | Jhaveri et al. | |
| 2007/0136654 A1* | 6/2007 | Peters | G06F 17/211 |
| | | | 715/217 |
| 2008/0028031 A1 | 1/2008 | Bailey et al. | |
| 2008/0033777 A1 | 2/2008 | Shukoor | |
| 2008/0034314 A1 | 2/2008 | Louch et al. | |
| 2008/0096174 A1 | 4/2008 | Bodlaender et al. | |
| 2008/0126951 A1* | 5/2008 | Sood | G06Q 10/107 |
| | | | 715/752 |
| 2008/0148166 A1* | 6/2008 | Brunswig | G06F 9/451 |
| | | | 715/766 |
| 2008/0301086 A1 | 12/2008 | Gupta | |
| 2009/0083614 A1* | 3/2009 | Wedekind | G06F 40/18 |
| | | | 715/217 |
| 2009/0098524 A1 | 4/2009 | Walton | |
| 2009/0150397 A1 | 6/2009 | Chen et al. | |
| 2009/0234699 A1 | 9/2009 | Steinglass et al. | |
| 2009/0259931 A1* | 10/2009 | Fujisawa | G06F 40/177 |
| | | | 715/227 |
| 2009/0262662 A1 | 10/2009 | Ramachandran et al. | |
| 2009/0327360 A1 | 12/2009 | Rajaram et al. | |
| 2011/0106589 A1* | 5/2011 | Blomberg | G06Q 10/063 |
| | | | 705/7.39 |
| 2011/0225494 A1 | 9/2011 | Shmuylovich et al. | |
| 2012/0035974 A1 | 2/2012 | Seybold | |
| 2012/0054511 A1 | 3/2012 | Brinks et al. | |
| 2012/0069131 A1 | 3/2012 | Abelow | |
| 2012/0116834 A1 | 5/2012 | Pope et al. | |
| 2012/0116835 A1 | 5/2012 | Pope et al. | |
| 2012/0131467 A1 | 5/2012 | Kemmler et al. | |
| 2012/0233312 A1 | 9/2012 | Ramakumar et al. | |
| 2013/0006688 A1 | 1/2013 | Knapp | |
| 2013/0007694 A1* | 1/2013 | Knapp | G06Q 10/10 |
| | | | 717/103 |
| 2013/0103764 A1 | 4/2013 | Verkasalo | |
| 2013/0304616 A1 | 11/2013 | Raleigh et al. | |
| 2014/0115557 A1 | 4/2014 | Holler et al. | |
| 2014/0129961 A1* | 5/2014 | Zubarev | G06F 3/0484 |
| | | | 715/752 |
| 2014/0195944 A1 | 7/2014 | Herger et al. | |
| 2015/0295996 A1* | 10/2015 | Peters | G06F 3/0481 |
| | | | 715/744 |
| 2015/0332198 A1* | 11/2015 | Toro | G06Q 10/06393 |
| | | | 705/7.39 |
| 2016/0012368 A1 | 1/2016 | O'Connell et al. | |
| 2016/0162448 A1* | 6/2016 | Wang | G06F 17/212 |
| | | | 715/236 |
| 2016/0189077 A1 | 6/2016 | Azmoon | |

OTHER PUBLICATIONS http://www.axosoft.com/quick-start#qsVideo5, Axosoft, "Quick start videos and guides", "Hit the ground running in your Axosoft evaluation with our comprehensive resources". Downloaded Dec. 17, 2014. Web site contains videos.

http://www.versionone.com/home/?utm_expid=653507-26.m1ATd7-AQp21H3jQ_QB_Hg.1&utm_referrer=http%3A%2F%2Fblog.softwareadvice.com%2Farticles%2Fproject-management%2F5-favorite-agile-project-management-uis-0314%2F, VersionOne, "Agile Made Easier, All-in-one agile project management platform for software organizations of any size." Downloaded Dec. 17, 2014. Web site contains videos.

http://www.versionone.com/home/?utm_expid=653507-26.m1ATd7-AQp21H3jQ_QB_Hg.1&utm_referrer=https%3A%2F%2Fwww.google.com%2F, Version One, "Agile Made Easier, All-in-one agile project management platform for software organizations of any size." Downloaded Dec. 17, 2014. Web site contains videos.

http://www.versionone.com/product/agile-visualization/, VersionOne, "Agile Visualization", "See How Everything Fits Together". Downloaded Dec. 17, 2014. Web site contains videos.

http://kanbantool.com/product, Kanban Tool, Online Kanban Boards, Insightful Analytics, Etc. Downloaded Dec. 17, 2014. Web site contains videos.

http://collaboration.about.com/od/projectmanagement/tp/7-Kanban-Board-Tools-For-Project-Collaboration.htm, "7 Kanban Board Tools for Project Collaboration", "Variety of lightweight, highly detailed, and easy to use Kanban Boards". Downloaded Dec. 17, 2014.

https://jira.atlassian.com/browse/GHS-3922, JIRA Agile, GHS-3922, "As a user, I would like to configure the cards displayed in the rapid board". Downloaded Dec. 17, 2014.

http://info.leankit.com/getting-started, "Getting Started with LeanKit", "Follow these 5 simple steps to get the most out of LeanKit". Downloaded Dec. 17, 2014. Web site contains videos.

* cited by examiner

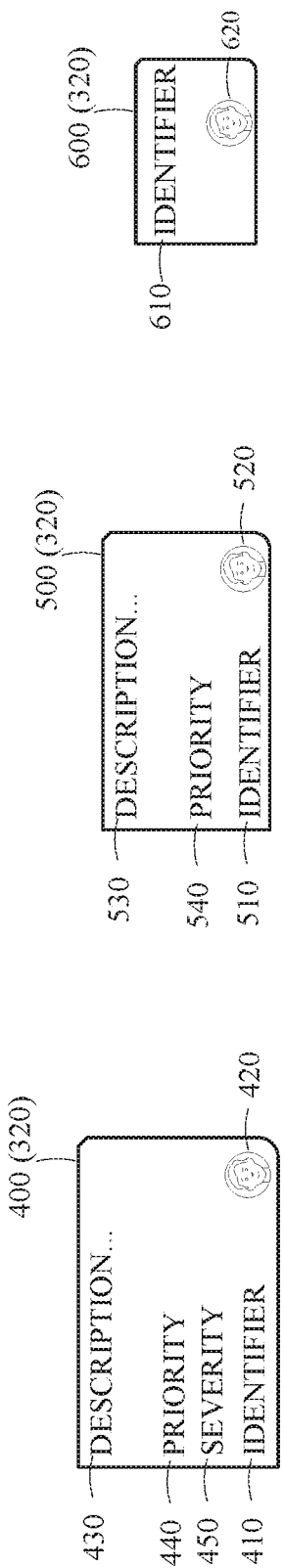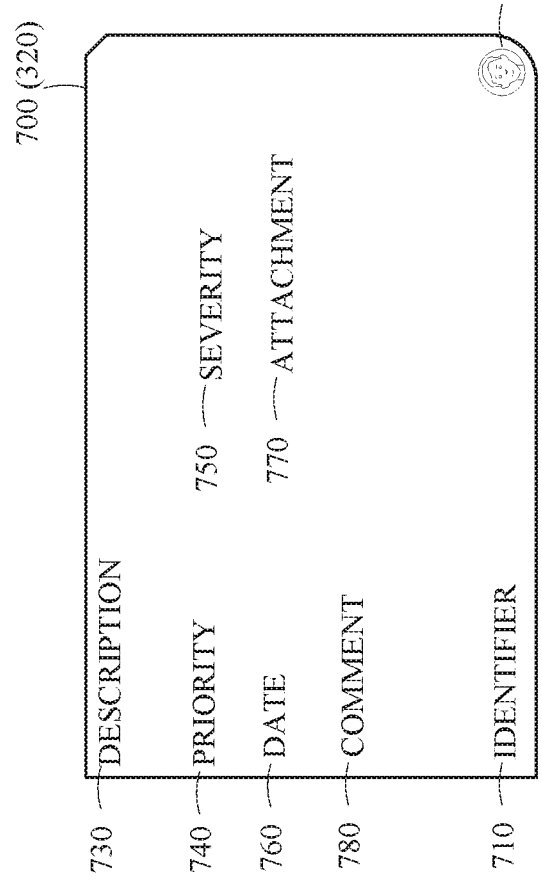

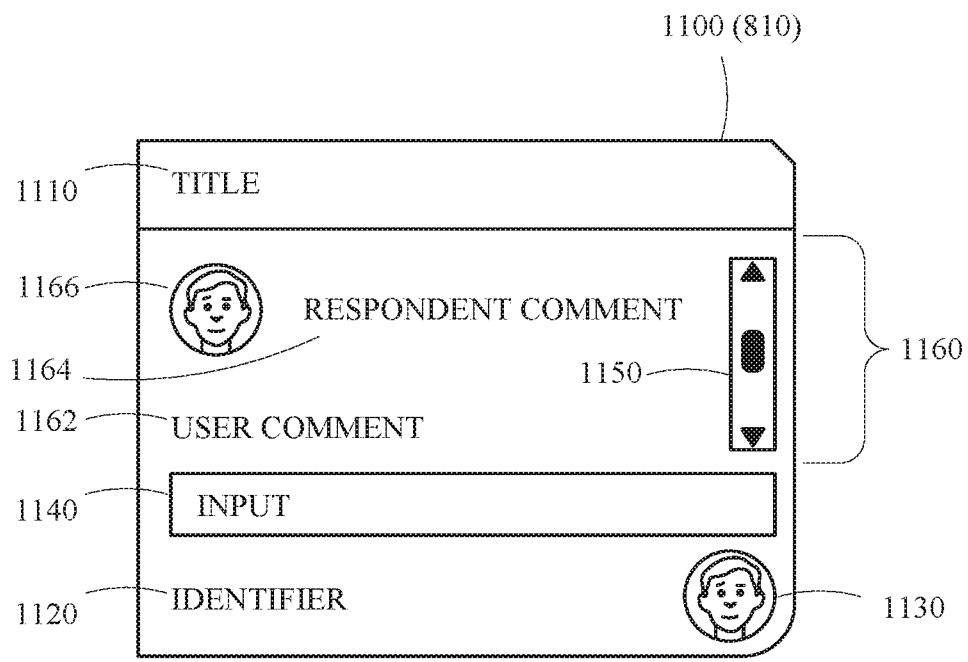
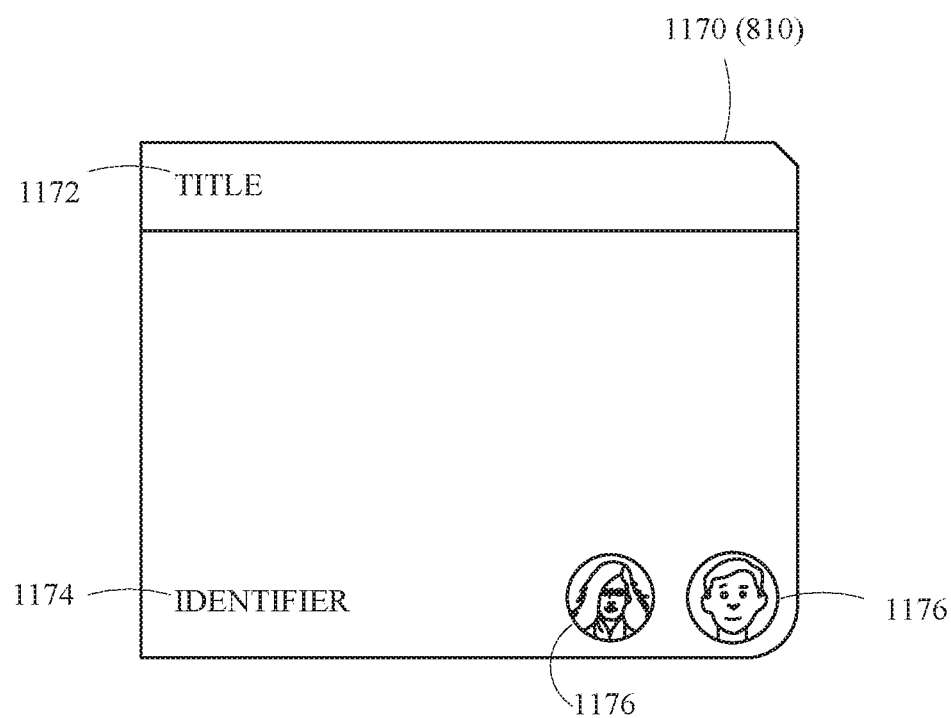
FIG. 11

FIG. 21

VISUAL TASK BOARD VISUALIZATION

CROSS REFERENCE TO RELATED APPLICATIONS

The present application claims the benefit of U.S. Provisional Application No. 62/098,456, filed Dec. 31, 2014, entitled, "Visual Task Board Visualization", herein incorporated by reference.

TECHNICAL FIELD

Disclosed herein are techniques and devices for visual task boards and in particular a graphical interface for visualizing management metrics.

BACKGROUND

Task management, which may include project management, system management, or the like, may require a user to track and analyze significant quantities of interrelated information. Accordingly, a visual task board would be advantageous.

SUMMARY

One implementation of the disclosure is an apparatus for operating a window region of a graphical user interface in an aggregation mode, comprising a processor configured to execute instructions stored in a memory, the instructions comprising an information set identifier module that identifies a visual task board information set structured in the memory that comprises a plurality of records, wherein each record comprises at least one information element from a plurality of information elements from the information set, an information element identifier module that identifies an information element from the plurality of information elements as a visualization metric for output on a display of the graphical user interface, an aggregation mode identifier module that identifies a first aggregation mode based on the first visualization metric, a graph generation module that generates a first graph display region based on the first aggregation mode for output on a display of the graphical user interface, a lane generation module that generates a first plurality of lane display regions of a graphical user interface window structured as lanes based on the first visualization metric, a card generation module that generates a first card display region of the graphical user interface window structured as a first card representing a first record from the plurality of records, a combining module that comprises combining the first card display region within a first lane display region from the first plurality of lane display regions, an output generation module that generates an output for display in the graphical user interface window, the output selected from the group consisting of the first graph display region and the first lane display region, and an output module that transmits the output via a graphical user interface output interface or stores in the output in the memory.

Another implementation of the disclosure is an apparatus for operating a window region of a graphical user interface in an aggregation mode, comprising a processor configured to execute instructions stored in a memory to identify a visual task board information set that comprises a plurality of records, wherein each record comprises at least one information element from a plurality of information elements from the visual task board information set, identify an information element from the plurality of information elements as a visualization metric, wherein a plurality of available visualization metric values is associated with the visualization metric, identify an aggregation mode based on the visualization metric, generate a graph based on the aggregation mode, wherein the graph comprises a plurality of graph portions, wherein each graph portion represents a respective available visualization metric value from the plurality of available visualization metric values, generate a plurality lanes based on the visualization metric, wherein each lane from the plurality of lanes corresponds with a respective available visualization metric value from the plurality of available visualization metric values, and wherein generating each lane from the plurality of lanes comprises generate a plurality of cards based on the visual task card information set, wherein each card from the plurality of cards represents a record from the plurality of records that comprises an information element that has a value that corresponds with the respective available visualization metric value that corresponds with the lane, and output for display a representation of the information set that comprises the plurality of lanes superimposed over the graph.

Another implementation of the disclosure is a computer-implemented method for operating a window region of a graphical user interface in an aggregation mode, comprising utilizing a processor for identifying a visual task board information set structured in a memory that comprises a plurality of records, wherein each record comprises at least one information element from a plurality of information elements from the information set, identifying an information element from the plurality of information elements as a first visualization metric, identifying a first aggregation mode based on the first visualization metric, generating a first graph display region based on the first aggregation mode for output on a display of the graphical user interface, generating a first plurality lane display regions of a graphical user interface window structured as lanes based on the first visualization metric, generating a first card display region of the graphical user interface window structured as a first card representing a first record from the plurality of records, including the first card display region in a first lane display region from the first plurality of lanes, generating, by the processor in response to instructions stored in a non-transitory computer readable medium, an output for display, the output selected from the group consisting of the first graph display region and the first lane display region, and transmitting via a graphical user interface output interface or storing in the memory the output.

BRIEF DESCRIPTION OF THE DRAWINGS

The description herein makes reference to the accompanying drawings wherein like reference numerals refer to like parts throughout the several views.

FIG. 4 is a pictorial diagram of an example of a medium task card in accordance with this disclosure.

FIG. 5 is a pictorial diagram of an example of a small task card in accordance with this disclosure.

FIG. 6 is a pictorial diagram of an example of a minimal task card in accordance with this disclosure.

FIG. 7 is a pictorial diagram of an example of a large task card in accordance with this disclosure.

FIG. 11 is a pictorial diagram of examples of cards in accordance with this disclosure.

FIG. 21 is a pictorial diagram of an example of a visual task board including a priority metrics mode graph and superimposed/overlayed cards in accordance with this disclosure.

DETAILED DESCRIPTION

Visual task boards provide a computer-based graphical user interface for navigating and managing project and system management information, including lists and forms. Records may be represented as cards on a display that a user can view and edit. For example, cards may represent tasks, incidents, problems, conversations, meetings, or the like. Cards may be organized into lanes based on metrics, such as status or user. Updates and edits to records may be tracked directly from the visual task board. Visual task boards may be customized to display cards based on user access permissions and privileges. In some applications, using visual task boards may include managing and collaborating on records. For example, a user, such as a support manager, may create a board for a team of users to track assigned tasks in real time.

In a visual task board, a user may dynamically revisualize the organization of the underlying information set into lanes and cards based on a selected metric, which may include any information element from the information set. For example, a user can visualize the visual task board information set in a visual task board organized based on task status, and can revisualize the information set in the visual task board organized by user. Users can adjust the size and position of cards and lanes within the visual task board. For example, a user can adjust a card to be vertically smaller or larger. The information included in a card automatically adjusts to changes in the available card space, and a user may control the information elements shown by adjusting the display priority for individual information elements. A visual task board may display aggregate metrics, which may be used for visualizing information using graphs and charts. Aggregate graphs may be viewed separately from cards, or with cards superimposed/overlayed over the aggregate metrics, which speeds up the display by providing a greater density of information to the user. Changes to the cards, or the underlying data set, are dynamically reflected in the aggregate metric visualizations.

Figure 1:
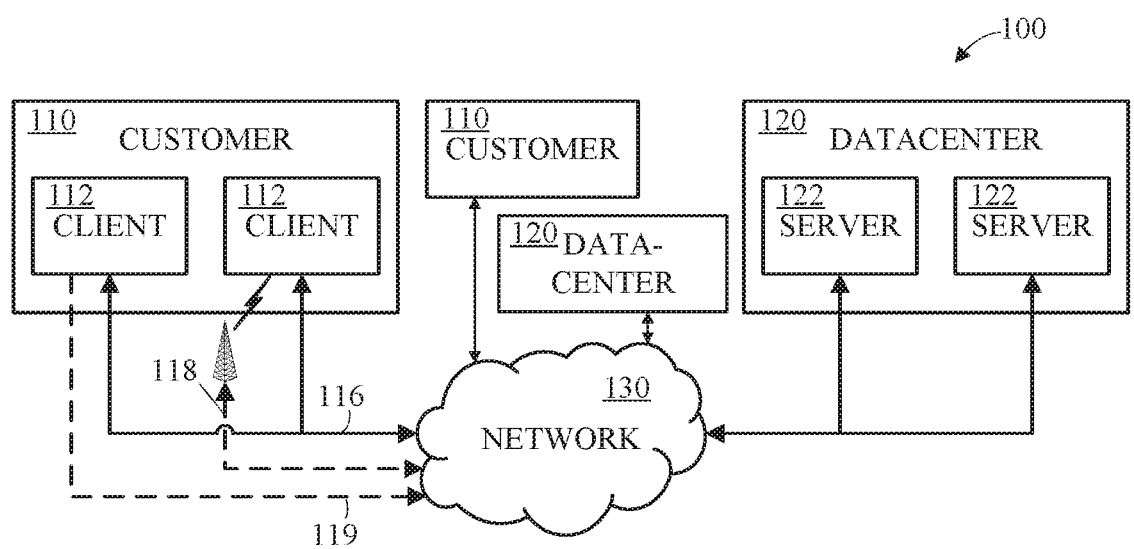
FIG. 1 is a block diagram of a networked distributed or cloud computing system in which the teachings herein may be implemented.

FIG. 1 is a block diagram of a distributed (e.g., client-server, networked, or cloud) computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system including multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer and the like. The datacenter 120 and servers 122 are examples only, and a cloud computing system may have a different number of datacenters and servers or may have a different configuration of datacenters and servers. For example, there may be tens of data centers and each data center may have hundreds or any number of servers.

Clients 112 and servers 122 may be configured to connect to network 130. The clients for a particular customer may connect to network 130 via a common connection point 116 or different connection points, e.g. a wireless connection point 118 and a wired connection point 119. Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients and servers shown may be included in system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122.

Figure 2:
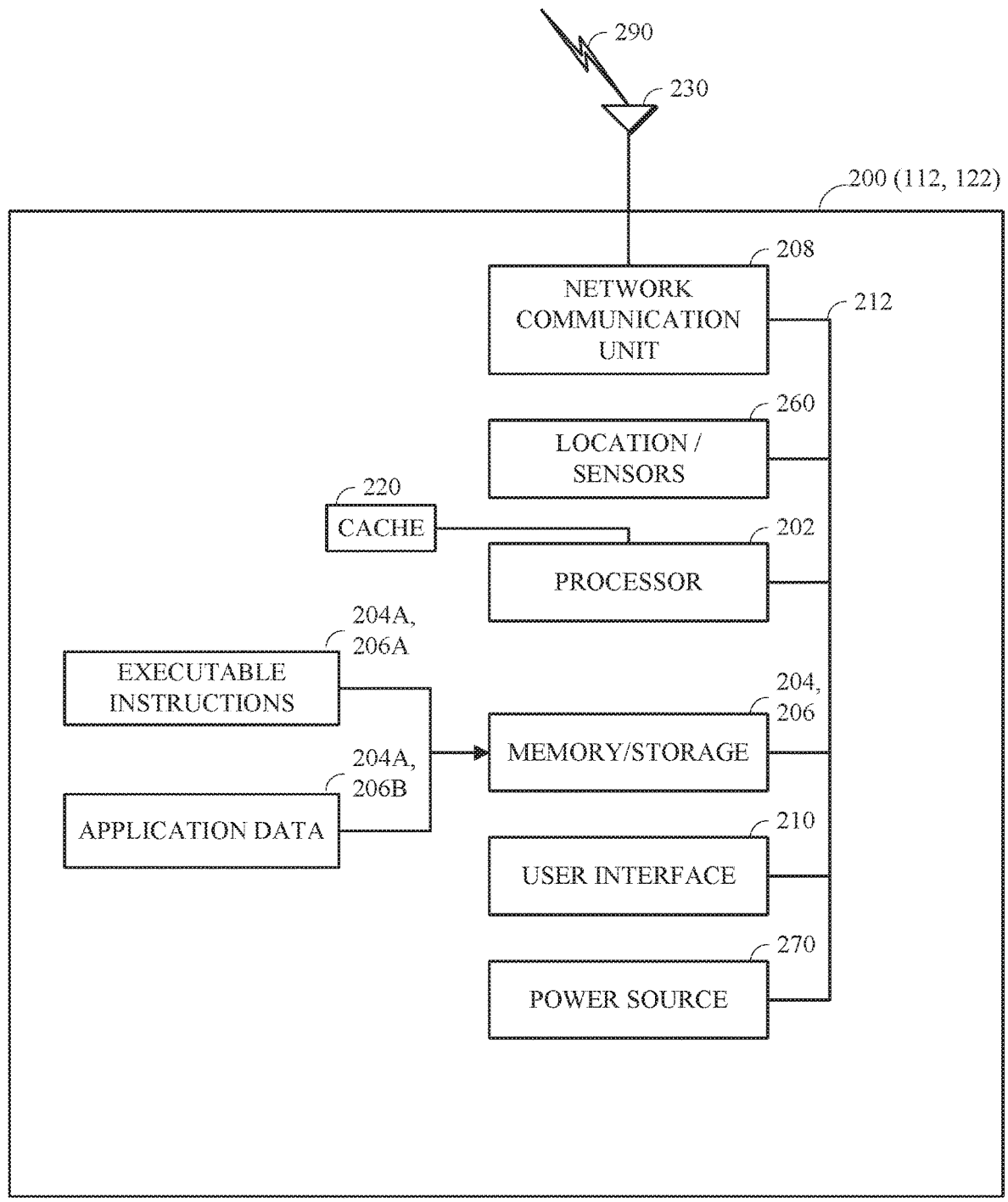
FIG. 2 is a block diagram of an example internal configuration of a computing device, such as a computing device of the computing system as shown in FIG. 1.

FIG. 2 is a block diagram of an example internal configuration of a computing device 200, such as a client 112 or server device 122 of the computing system 100 as shown in FIG. 1, including an infrastructure control server, of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general purpose processor or a special purpose processor.

Random Access Memory (RAM 204) can be any suitable non-permanent storage device that is used as memory. RAM 204 can include executable instructions and data for immediate access by CPU 202. RAM 204 typically comprises one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 206 can include executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein.

The term module, as used herein, can be implemented using hardware, software, or a combination thereof. A module may form a part of a larger entity, and may itself be broken into sub-entities. When a module is implemented using software, this software can be implemented as algorithmic components comprising program instructions stored in a memory, the instructions designed to be executed on a processor. The term "module" does not require any specific form of coding structure, and functional implementations of different modules may be independent but also may overlap and be performed by common program instructions. For example, a first module and a second module may be implemented using a common set of program instructions without distinct boundaries between the respective and/or common instructions that implement the first and second modules.

The operating system can be, for example, a Microsoft Windows®, Mac OS X®, or Linux®, or operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 includes instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU 202 via bus 212. The network communication unit 208 can utilized any of a variety of standardized network protocols, such as Ethernet, TCP/IP, to name a few of many protocols, to effect communications between devices. The interface 230 can comprise one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. A graphical user interface (GUI) 210 is specifically a user interface that allows people to interact with a device in a graphical. It can be broken down into an input portion, an output portion, and a processor that manages, process, and interacts with the input and output portions. The input portion can accept input created by elements such as a mouse, touchpad, touchscreen, or the like. The output portion of a GUI can generate input displayable on some form of a display, such as a cathode-ray tube (CRT), liquid crystal display (LCD), and light emitting diode (LED) display, such as an organic light emitting diode (OLED) display. The display is generally formed of a grid of pixels, each of which can take on various illumination and optionally color values that are grouped together and arranged to form various higher-level entities (in pixel regions) on the display. These pixel regions can make up icons, windows, buttons, cursors, control elements, text, and other displayable entities. The display utilizes graphical device interface that typically comprises a graphics processor specifically designed to interact with the hardware of the display, and may accept high-level instructions from other processors to reduce demands on them. The graphical device interface typically has its own memory that serves as a buffer and also allows manipulation of stored data by the graphics processor. Operation of the display thus typically involves the graphics processor accessing instructions and data stored memory to modify pixel regions on the display for the user.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

Figure 3:
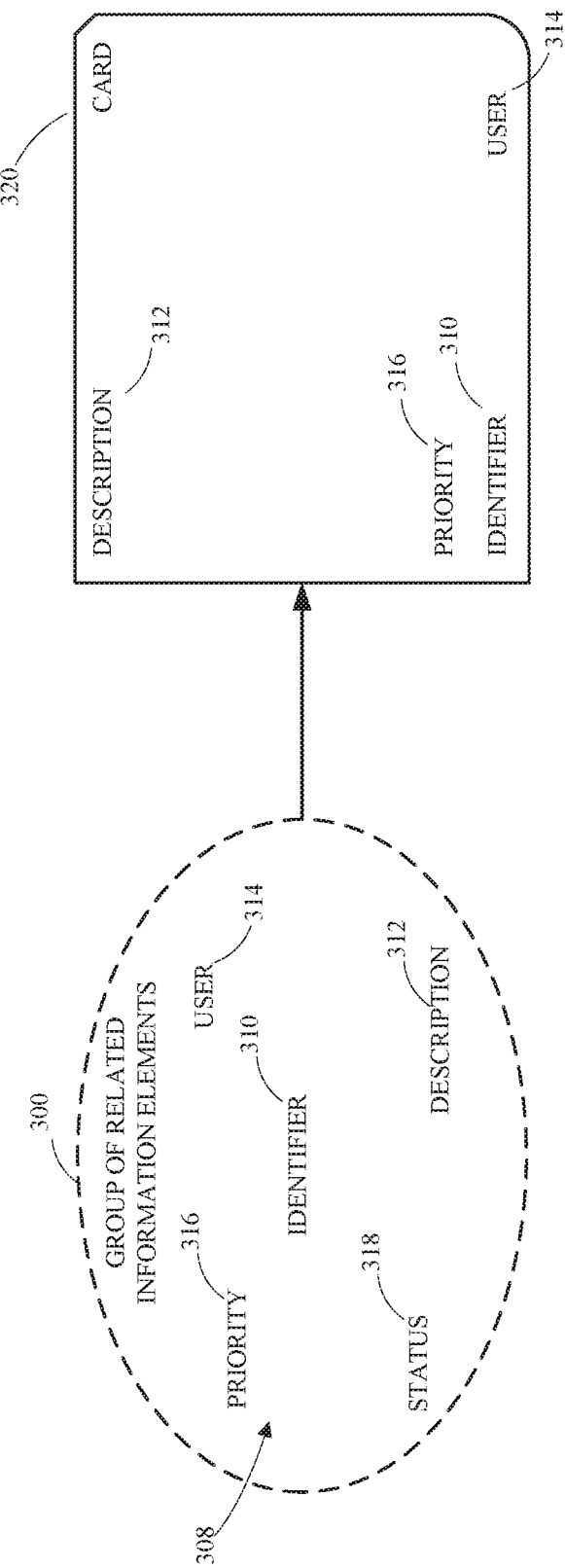
FIG. 3 is a block diagram of an example of representing information in a visual task board in accordance with this disclosure.

FIG. 3 is a block diagram of an example of the type of representing information that may be present within a visual task board 900 (shown in FIG. 9 and described below) in accordance with this disclosure. A visual task board 900 may represent a visualization on a display of an underlying information set. In some applications, the underlying information set represented by a visual task board 900 may fully or partially overlap with an information set represented by another visual task board 900.

Visual task boards 900 may efficiently represent information in an organized structure. For example, a group 300 of related information elements 310, 312, 314, 316, 318, (generically information elements 308), also referred to herein as an information set 300, which may correspond with a record, may be represented in a visual task board 900 as a card 320 or a card display region. A card may represent a discrete grouping of related information, such as information regarding an individual task, an issue, a problem, an event, a conversation, a meeting, or the like. A card 320 may include information, such as comments, attachments, labels, assigned users, status, priority, severity, or a combination thereof, which may be added, removed, or modified in response to user input. In some applications, a card 320 may include a subgrouping of discrete information elements 308. For example, a card may include one or more comments related to a common criterion, such as an incident or a task, and each comment may include multiple discrete information elements, such as a comment text, a date, a time, a commenter identifier, or a combination thereof. In some applications, one or more information elements 308, from a group 300 of related information elements may be omitted from a card. For example, the card 320 shown in FIG. 3 omits the status information element 318.

In a visual task board 900, the amount of information, the type of information, the organization of information, or a combination thereof, included in a card 320 may be automatically adjusted based on the size of the card 320 (and 400, 500, 600, and 700 shown in FIGS. 4-7), and generating a visual task board 900 may include performing scaled visualization, which may include determining the information elements 308 to include in each card 320 based on the size of the card, the number of information elements in the group of data represented by the cards, and the space required for displaying each information element. In some applications, each information element 308 may be associated with a display rank, which may indicate a priority for including the information element 308 in a card 320, and generating a visual task board 900 may include determining the information elements 308 to include in each card 320 based on the size of the card, the number of information elements in the group of data represented by the cards, the space required for displaying each information element, and the display rank for each information element. For example, each information element may have a unique display rank, such as 1, 2, 3, 4, or the information elements may have categorical display ranks, such as high, medium, and low. Display regions, as defined herein, are bounded areas that may be present on a display, and can take on any size, shape, etc. A display region is a structured set of data that may be stored in memory prior to display and does not have to actually be displayed in order to constitute a display region.

FIGS. 4-7 are pictorial diagrams showing examples of cards (FIG. 3, card 320, FIGS. 4-7, cards 400, 500, 600, 700) representing a task that includes various information elements 308, including a task identifier information element, which has a display rank of 1, a user identifier information element, which has a display rank of 2, a description information element, which has a display rank of 3, a task priority information element, which has a display rank of 4, a task severity information element, which has a display rank of 5, a creation date information element, which has a display rank of 6, an attachment information element, which has a display rank of 7, and a comments information element, which has a display rank of 8. Although four sizes of cards 400, 500, 600, 700 are shown for simplicity and by way of example only, any card size may be used. A particular size of the card to use may be either user-selected or system determined, based on the element size, display rank, and other factors described herein.

FIG. 4 is a pictorial diagram of an example of a medium task card 400 in accordance with this disclosure. Generating the medium task card 400 may include determining whether to include each information element 308, 410-450 for the task in the card 400 based on the available space in the card and the respective display rank for each information element 308. For example, generating the medium task card 400 may include determining that the task identifier information element 410 has the highest display rank among the information elements 308 for the task, determining that there is space available for the task identifier information element 410 in the card 400, and including the task identifier information element 410 in the card 400. Similarly, generating the medium task card 400 may include determining that the user identifier information element 420 has the second highest display rank among the information elements 308 for the task, determining that there is space available for the user identifier information element 420 in the card 400, and including the user identifier information element 420 in the card 400. Similarly, generating the medium task card 400 may include determining that the description information element 430 has the third highest display rank among the information elements 308 for the task, determining that space is available for the description information element 430 in the card 400, and including the description information element 430 in the card 400. Similarly, generating the medium task card 400 may include determining that the task priority information element 440 has the fourth highest display rank among the information elements 308 for the task, determining that space is available for the task priority information element 440 in the card 400, and including the task priority information element 430 in the card 400. Similarly, generating the medium task card 400 may include determining that the task severity information element 450 has the fifth highest display rank among the information elements 308 for the task, determining that space is available for the task severity information element 450 in the card 400, and including the task severity information element 450 in the card 400. Generating the medium task card 400 may include determining that there is not enough space available in the card 400 to include the creation date information element, the attachment information element, and the comments information element in the card 400, and omitting the creation date, the attachment, and the comments from the card 400.

FIG. 5 is a pictorial diagram of an example of a small task card 500 in accordance with this disclosure. A small card 500 may be similar to a medium card, such as the medium card 400 shown in FIG. 4, except that a small card 500 may be horizontally smaller, vertically smaller, or both, and a small card 500 may omit one or more of the information elements 410-450 included in a medium card 400, may omit a portion of one or more information elements (not shown), or may omit one or more information elements 410-450 and one or more portions of information elements. For example, a small card 500 may omit severity information 450 included in a medium card. In another example, a portion of the description may be truncated. Generating the small task card 500 may include determining that there is space available in the card 500 to include the task identifier 510, the associated user identifier 520, the description 530, and the priority 540, including the task identifier 510, the associated user identifier 520, the description 530, and the priority 540 in the card 500, determining that there is not enough space available to include the severity, the creation date, the attachment, and the comments in the card 500, and omitting the severity, the creation date, the attachment, and the comments from the card 500 based on the display ranking of the information elements.

FIG. 6 is a pictorial diagram of an example of a minimal task card 600 in accordance with this disclosure. A minimal card 600 may be similar to a small card, such as the small card 500 shown in FIG. 5, except that a minimal card 600 may be horizontally smaller, vertically smaller, or both, and a minimal card 600 may omit one or more of the information elements 510-540 included in a small card 500, may omit a portion of one or more information elements (not shown), or may omit one or more information elements 510-540 and one or more portions of information elements. For example, a minimal card 600 may omit the description 530 and the priority 540 information included in a small card 500. Generating the minimal task card 600 may include determining that there is space available in the card 600 to include the task identifier 610 and the associated user identifier 620, including the task identifier 610 and the associated user identifier 620 in the card 600, determining that there is not enough space available to include the description, the priority, the severity, the creation date, the attachment, and the comments in the card 600, and omitting the description, the priority, the severity, the creation date, the attachment, and the comments from the card 600.

FIG. 7 is a pictorial diagram of an example of a large task card 700 in accordance with this disclosure. A large card 700 may be similar to a medium card, such as the medium card 400 shown in FIG. 4, except that a large card 700 may be horizontally larger, vertically larger, or both, and a large card 700 may include one or more information elements 308 omitted from a medium card 400, may include a portion of one or more information elements omitted from a medium card (not shown), or may include one or more information elements 308 omitted from a medium card and a portion of one or more information elements omitted from a medium card. Generating the large task card 700 may include determining that there is space available in the card 700 to include the task identifier 710, the associated user identifier 720, the description 730, the priority 740, the severity 750, a creation date 760, an attachment 770, and comments 780.

In some applications, generating a card may include determining a layout for including information elements in the card. For example, generating a large tsk card, such as the large task card 700 shown in FIG. 7, may include determining that the card includes enough space to include the task severity 750 to the right of the task priority 740, and generating a medium tsk card, such as the medium task card 400 shown in FIG. 4, may include determining that the card does not include enough space to include the task severity 450 to the right of the task priority 440.

Figure 8:
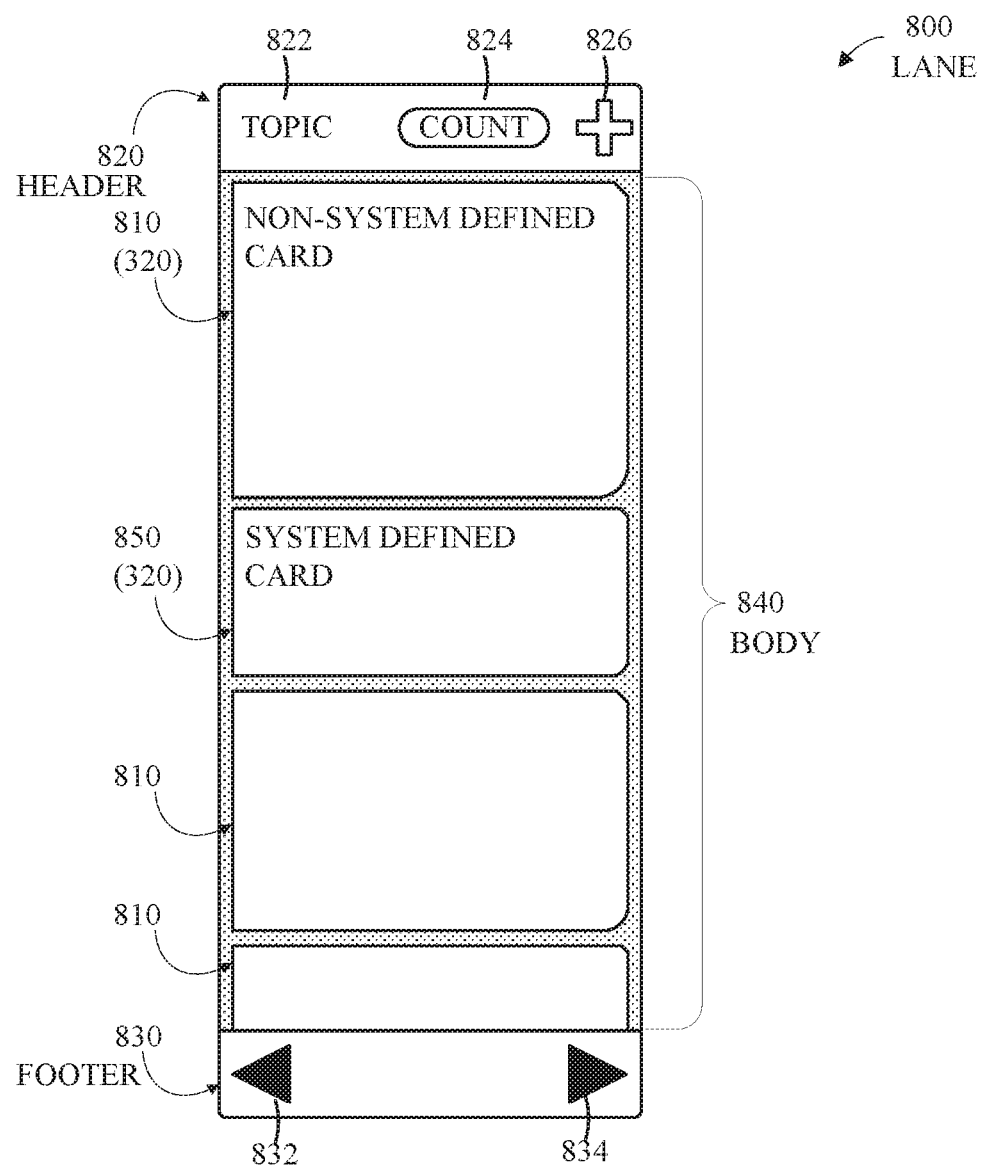
FIG. 8 is a pictorial diagram of an example of a lane in accordance with this disclosure.

FIG. 8 is a pictorial diagram of an example of a lane 800 or a lane display region in accordance with this disclosure. In a visual task board 900, a group of related cards 810, 850 (which are cards 320 from FIG. 3), such as the card 400 shown in FIG. 4, the card 500 shown in FIG. 5, the card 600 shown in FIG. 6, the card 700 shown in FIG. 7, or a combination thereof, may be represented as a lane 800. A lane 800 may organize cards 810, 850 into a vertical group. A lane 800 may represent a defined criterion, such as a subject, which may correspond to a logical grouping of cards, such as a task status or user identifier. For example, a lane may represent a task status, such as "To Do", "Doing", or "Done". In some applications, in a visual task board 900, such as a guided board, each lane may represent a possible field value. For example, a visual task board for an "Incident" table can include a lane for each State value, such as "New", "Active", or "Resolved".

As shown in FIG. 8, a lane 800 may include a lane header 820, a lane footer 830, a lane body 840, or a combination thereof. The lane header 820 may include information, controls, or both. For example, a lane header 820 may include an indication of the subject 822 for the lane 800; a number, count, or cardinality, of records 824 in the lane; or a new record control 826, to add a new record to the lane 800. A lane footer 830 may include, for example, one or more controls to organize the lane relative to other lanes, such as a move left control 832, a move right control 834, or both. The lane body 840 may include zero or more non-system defined cards 810. These cards 810 may be related to a common criterion, which may correspond with the lane type. For example, each card in a "To Do" type lane may have the status "To Do". In some applications, a lane 800 may include a system defined card 850. A system defined card 850 may include information, controls, or both, that are related to the lane independent of the information represented by the other non-system defined cards 810 in the lane. For example, a system defined card 850 may include a control to add a card to the lane, or may include a description of the information represented by the lane.

Figure 9:
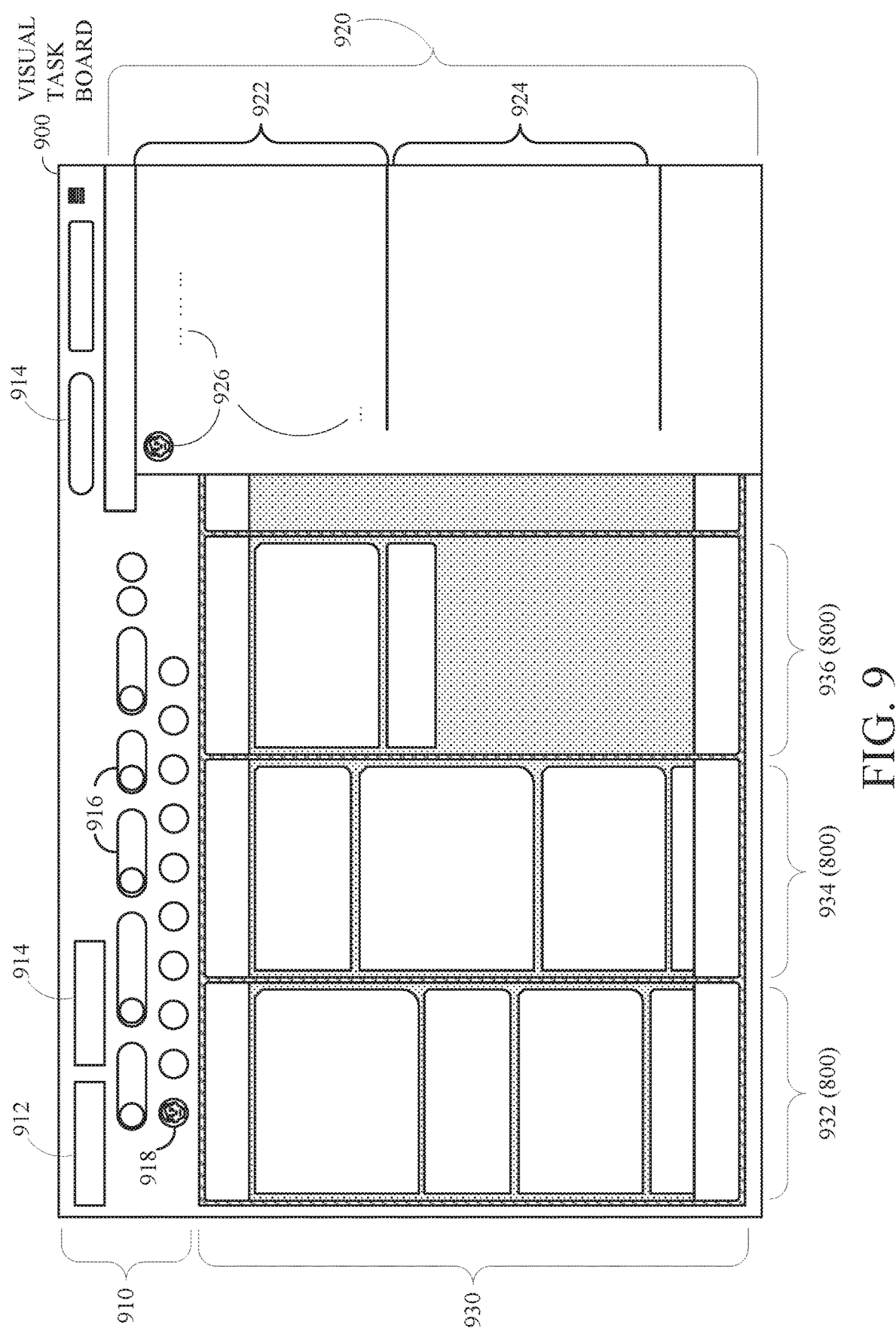
FIG. 9 is a pictorial diagram of an example of a visual task board in accordance with this disclosure.

FIG. 9 is a pictorial diagram of an example of a visual task board 900 in accordance with this disclosure. A visual task board 900 may include a visualization representing a defined underlying information set 300 300, such as a set of problems reported for a system or a set of tasks for a project. In some implementations, a visual task board 900 may be implemented in a computing system, such as the cloud computing system 100 shown in FIG. 1. For example, the visual task board 900 may be implemented on a server, such as one or more of the servers 122 shown in FIG. 1, and may be accessed by a computing device, such as a client 112 shown in FIG. 1, via a network, such as the network 150 shown in FIG. 1. The implementation may be done by a combination of hardware and software components, wherein the software components may be program modules or algorithms containing a sequence of program instructions that execute on processors of the clients, servers, and other computing devices. The respective program modules or algorithms are discussed in more detail herein.

The visual task board 900 may include a dashboard portion 910, an activity stream portion 920, a task board portion 930, or a combination thereof, as shown. The dashboard 910 may include information and controls for the visual task board 900. For example, the dashboard 910 may include a task board type identifier 912, task board information elements 914, label indicators 916, member indicators 918, or a combination thereof.

A task board type identifier 912 may identify a task board type, such as freeform, flexible, or guided, for the current task board. A freeform type visual task board 900 may include any kind of task record, such as personal tasks. Members of freeform boards 900 may add and remove cards 810 and lanes 800. A flexible task board 900 may include tasks that match a configured filter against a defined table. Members of flexible boards 900 can add cards 810 and define custom lanes 800. In some applications, cards 810 in a flexible task board 900 may be removed automatically when a corresponding task no longer matches the filter conditions for the task board 900. A guided task board 900 may be similar to ta flexible task board 900, except that lanes 800 in a guided board 900 may correspond to field values, and editing the lanes 800 may be prevented. In some applications, a task board type identifier 912 may indicate the underlying data set represented by the visual task board 900.

The task board information elements 914 may indicate information about the visual task board 900. For example, a task board information element 914 may indicate a name or description of the task board, such as "Incidents by State." In another example, a task board information element 914 may indicate statistical information about the task board 900, such as a number of lanes, a number of tasks, or both. The labels 916 may include a legend, which may describe aspects of the visual task board 900. For example, the labels 916 may indicate that defects are shown in red or that high priority items are shown in blue. In some applications, the labels 916 may include one or more controls. For example, the labels 916 may include a control for adding a member or user to the information set 300 represented by the visual task board 900. The member identifiers 918 may indicate members, or users, of the information set 300 represented by the visual task board 900.

The activity stream portion 920 may indicate a history of changes to cards 810, and the corresponding records, on the visual task board 900. For example, a first activity stream section 922 may correspond with the most recent change, and a second activity stream section 924 may correspond with a previous change. Each section 922, 924 of the activity stream 920 may include information 926 for the corresponding change, such as an identifier for the change, an indication of a user associated with the change, a date associated with the change, or any other information related to the change. In some applications, the activity stream 920 may be omitted, or partially omitted, from the task board 900.

The task board portion 930 may include lanes 932, 934, 936, such as the lane 800 shown in FIG. 8, which may include cards 810, such as the cards 320, 400, 500, 600, 700 shown in FIGS. 3-7. The visual task board 900 may represent the underlying information set 300 organized based on a defined metric. For example, the underlying information set 300 300 may include records that include information elements 308, and the defined metric may be one of the information elements 308 included in one or more of the records. Each lane 800 may represent a value of the defined metric. Each lane 800 may include cards 810, and each card may represent a record from the underlying information set 300 300.

Although FIG. 9 shows an example configuration for simplicity and clarity, the visual task board 900 is not limited to a particular configuration. For example, the organization and configuration of lanes and cards may be customized in response to user input.

Figure 10:
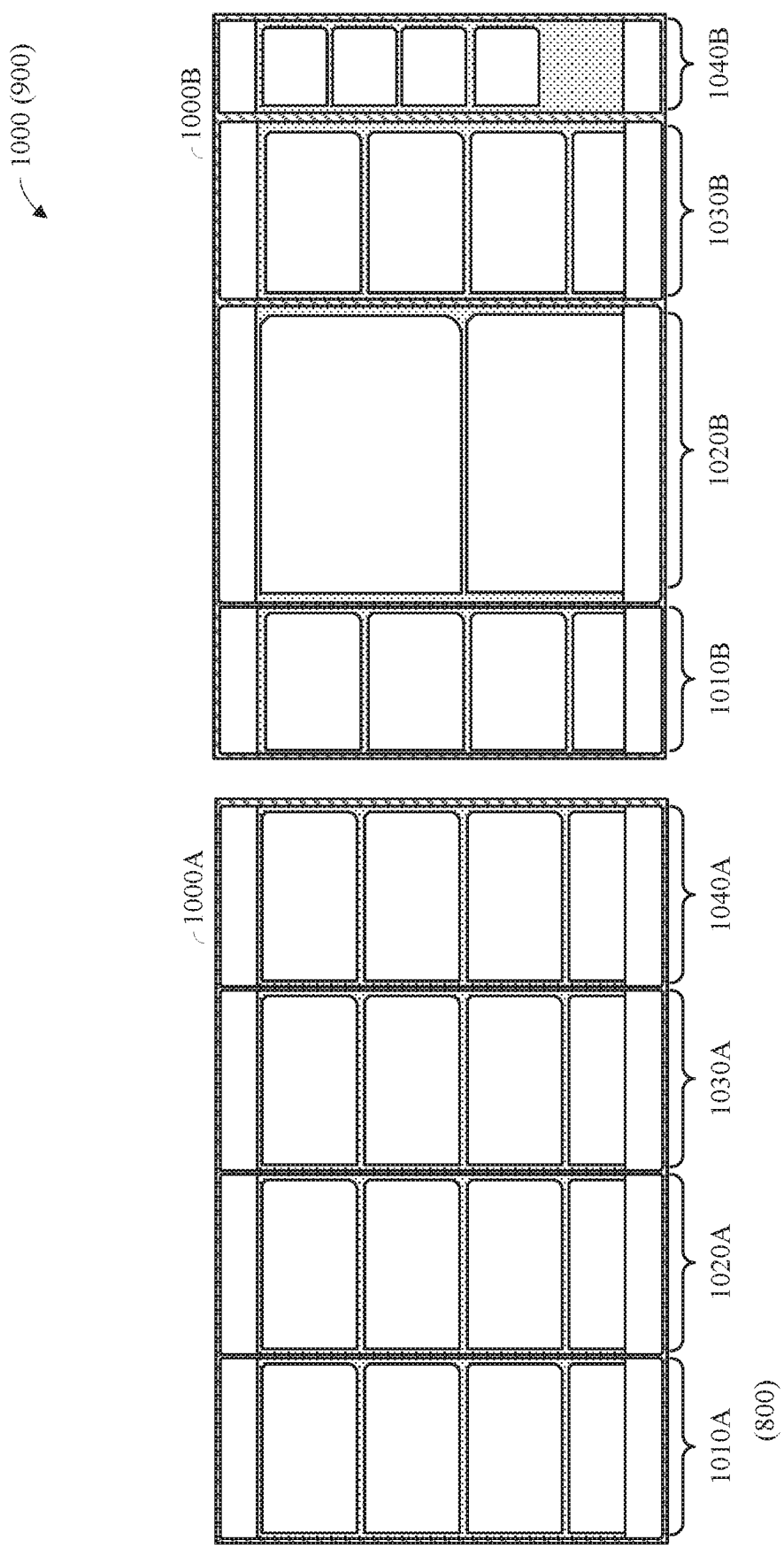
FIG. 10 is a pictorial diagram of an example of customizing a visual task board in accordance with this disclosure.

FIG. 10 is a pictorial diagram of an example of customizing a visual task board in accordance with this disclosure. An uncustomized task board portion 1000A of a visual task board 900, such as the visual task board 1000 shown in FIG. 10, is shown on the left and a corresponding customized task board portion 1000B of the visual task board 900 is shown on the right. Customizing a visual task board may include customizing the task board 1000 to emphasize or de-emphasize identified information by adjusting the size of one or more lanes 800, adjusting the size of one or more cards 810, by adjusting the display rank for one or more information elements, or adjusting a combination of lane width, card height, and display rank. In some applications, the amount of information, the type of information, the organization of information, or a combination thereof, included in a card may be automatically adjusted in response to user input adjusting the width of the lane including the card, the height of the cards in the lane, the display rank of the information elements represented by the card, or a combination thereof.

For example, the horizontal size of a lane 800 may be customized in response to user input, such as user input indicating the selection of a vertical border of a lane 800, user input indicating dragging the selected border to the left or right, and user input indicating a release of the selection of the border. In another example, the vertical size of a card 810 may be customized in response to user input, such as user input indicating the selection of a horizontal border of a card 810 in a lane 800, such as the topmost card in the lane, user input indicating dragging the selected border up or down, and user input indicating a release of the selection of the border. In another example, the display rank of the information elements for a card may be customized in response to user input, such as user input selecting a modal view for the card 810, which may be expressed as showing a back of the card 810 (the back displaying other information, such as display rank), and user input altering a display rank for an information element for the card.

In the example, shown in FIG. 10, the uncustomized task board portion 1000A includes four uncustomized lanes 1010A, 1020A, 1030A, 1040A. Each uncustomized lane 1010A, 1020A, 1030A, 1040A has an uncustomized width, which may be a default width, such as a width determined based on a function of the width of the task board portion and the number of lanes 800, a predefined standard card 810 width, or the like. Each uncustomized lane 1010A, 1020A, 1030A, 1040A includes four cards 810, each having an uncustomized height, which may be a default height. As shown, each card in the uncustomized task board portion 1000A is a medium size card, such as the medium size card 400 shown in FIG. 4.

In the customized task board portion 1000B in which adjustments have been made, the width of the first lane 1010B is smaller than the width of the corresponding lane 1010A from the uncustomized task board portion 1000A, and the cards in the first lane 1010B may have a smaller horizontal width than the corresponding cards from the uncustomized task board portion 1000A. For example, the cards in the first lane 1010B may be small cards, such as the small cards 500 shown in FIG. 5. Similarly, the width of the second lane 1020B is larger than the width of the corresponding lane 1020A from the uncustomized task board portion 1000A, and the cards in the second lane 1020B may have a larger horizontal width than the corresponding cards from the uncustomized task board portion 1000A. The vertical height of the cards in the second lane 1020B is larger than the height of the corresponding cards from the uncustomized task board portion 1000A. For example, the cards in the second lane 1020B may be large cards, such as the large cards 700 shown in FIG. 7. Similarly, the width of the fourth lane 1040B is smaller than the width of the corresponding lane 1040A from the uncustomized task board portion 1000A, and the cards in the fourth lane 1040B have a smaller horizontal width than the corresponding cards from the uncustomized task board portion 1000A. The vertical height of the cards in the fourth lane 1040B is smaller than the height of the corresponding cards from the uncustomized task board portion 1000A. For example, the cards in the fourth lane 1040B may be minimal cards, such as the minimal cards 600 shown in FIG. 6.

In some applications, a visual task board customization may be associated with an identified user. For example, multiple users may access a visual task board representing a set of information, and each user may independently customize the visual task board without disrupting the customization of other users. In contrast, changes to the information represented by the visual task board may be automatically reflected for all users. For example, a user may adjust the size or position of a lane in the visual task board independently of the size and position of the lane for other users, and the user may move a task from one lane to another, and the visual task board may be updated for all users. To achieve this, an underlying data set that defines a base task board 1000 and its constituent components can be modified by a set of customization data on a per-user, per group, or global basis so that the underlying data does not need to change in response to the customization. Either the uncustomized or a customized variant can then easily be displayed.

FIG. 11 is a pictorial diagram of examples of specialized cards 1100, 1170, which are variants of cards 810, in accordance with this disclosure. In some implementations, a lane, such as the lane 800 shown in FIG. 8, may include a chat card 1100, which may represent a conversation, and which may be related to the subject represented by the lane. In some implementations, a lane, such as the lane 800 shown in FIG. 8, may include a meeting card 1170, which may represent a meeting with one or more users.

As shown in FIG. 11, a chat card 1100, which is a specific form of a card 810, may include a title 1110, a conversation identifier 1120, an associated user identifier 1130, an input control 1140, a scroll control 1150, a conversation history 1160, or a combination thereof. The conversation history 1160 may include comments from the current user 1162, comments from a respondent 1164, or a combination thereof. A respondent identifier 1166 may be included with each respondent comment 1164. In some applications, the title 1110 may be customizable and searchable. For example, a user may add, edit, or remove a chat card title. In some applications, the title 1110 may be automatically assigned based on the user identifiers of the users communicating in the chat. For example, a chat may include the current user and a second user, such as a user with the user identifier "JSmith", each user may be a registered system user, and the chat title 1110 may be automatically generated to indicate that the chat is a chat between the current user and the second user, such as "Chat with JSmith".

Figure 12:
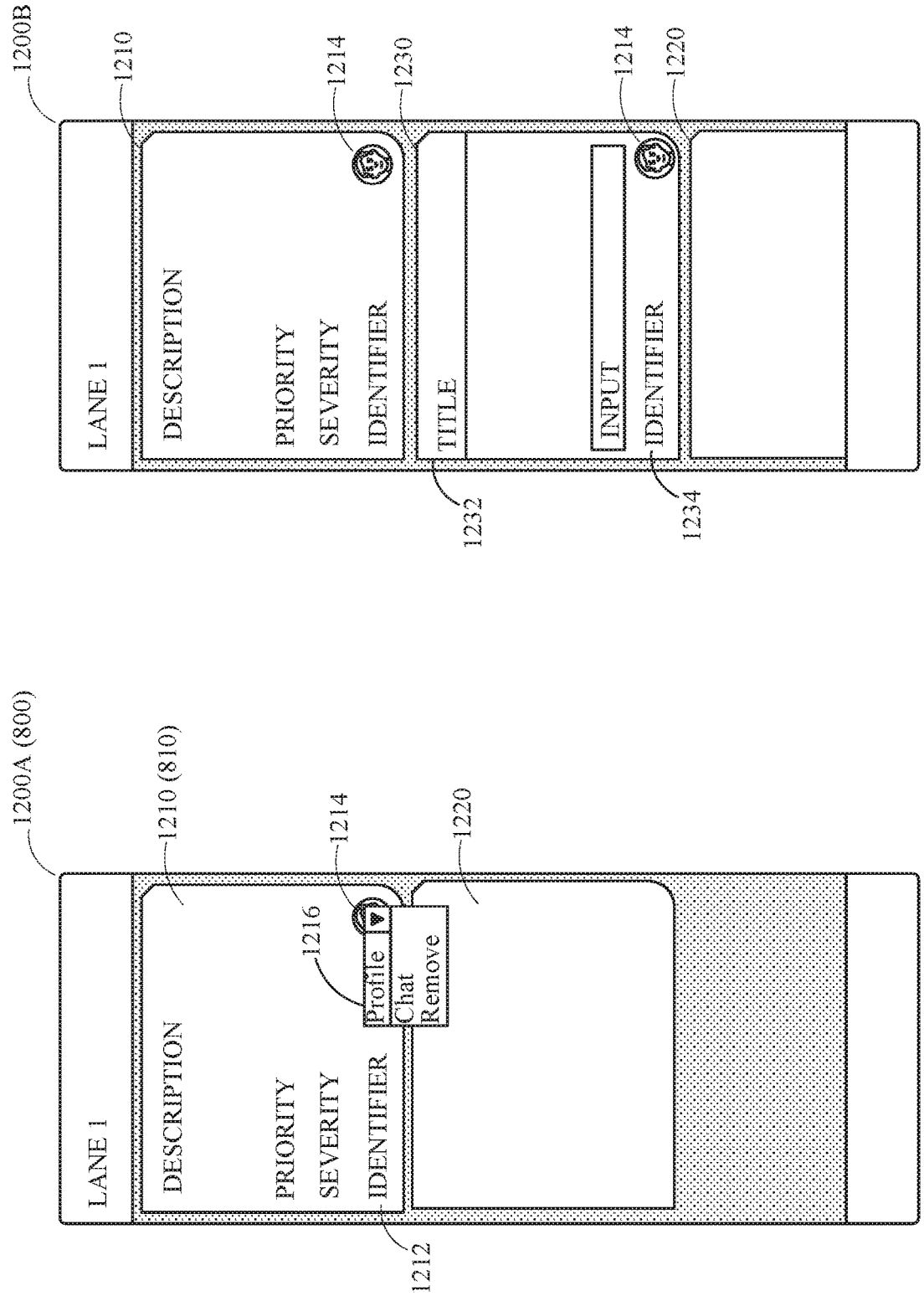
FIG. 12 is a pictorial diagram of an example of adding a chat card to a lane in accordance with this disclosure.

FIG. 12 shows a diagram of an example of adding a chat card 1100, 1230 to a lane 800 in accordance with this disclosure. A chat card 1100, 1230 may be added to a lane 800 in response to user input. For example, the lane 1200A shown on the left includes a first task card 1210 and a second task card 1220. The first task card 1210 includes a task identifier 1212 and an associated user identifier 1214. In response to user input selecting the associated user identifier 1214, an options menu 1216 may be displayed, which may include options related to the associated user identifier 1214, such as profile, chat, and remove, as shown. In response to user input selecting the chat option from the options menu 1216 a chat card may be added to the lane as shown in the lane 1200B on the right.

Adding the chat card 1230 to the lane 1200B may include associating the conversation represented by the chat card 1230 with the subject of the lane, with the identifier 1212 of the source card 1210, with an identifier of the user adding the card, with the associated user identifier 1214, or with a combination thereof. The chat card 1230 may include a title 1232, a conversation identifier 1234, the associated user identifier 1214, or a combination thereof. For example, the associated user identifier 1214 may represent a user named John, and the title 1232 may be "Chat with John". The chat card 1230 may be added immediately below the initiating task card 1210 and the other task card 1220 may be moved below the chat card 1230 in the lane 1200B.

In some applications, a modal window (not shown) including a conversation may be displayed in response to user input, such as user input indicating a double click, or a long press, on a portion of the chat card 1230.

In some applications, generating a lane, such as the lane 800 shown in FIG. 8, may include including a chat card in the lane for each conversation associated with the subject of the lane, associated with another card in the lane, or a combination thereof. In some applications, a conversation may be associated with a record, such as a task, an event, an incident, or the like, in response to user input. For example, a task may have the task identifier "ID1234", and a conversation may be associated with the task in response to user input indicating the text "@@1234" in the conversation.

Figure 13:
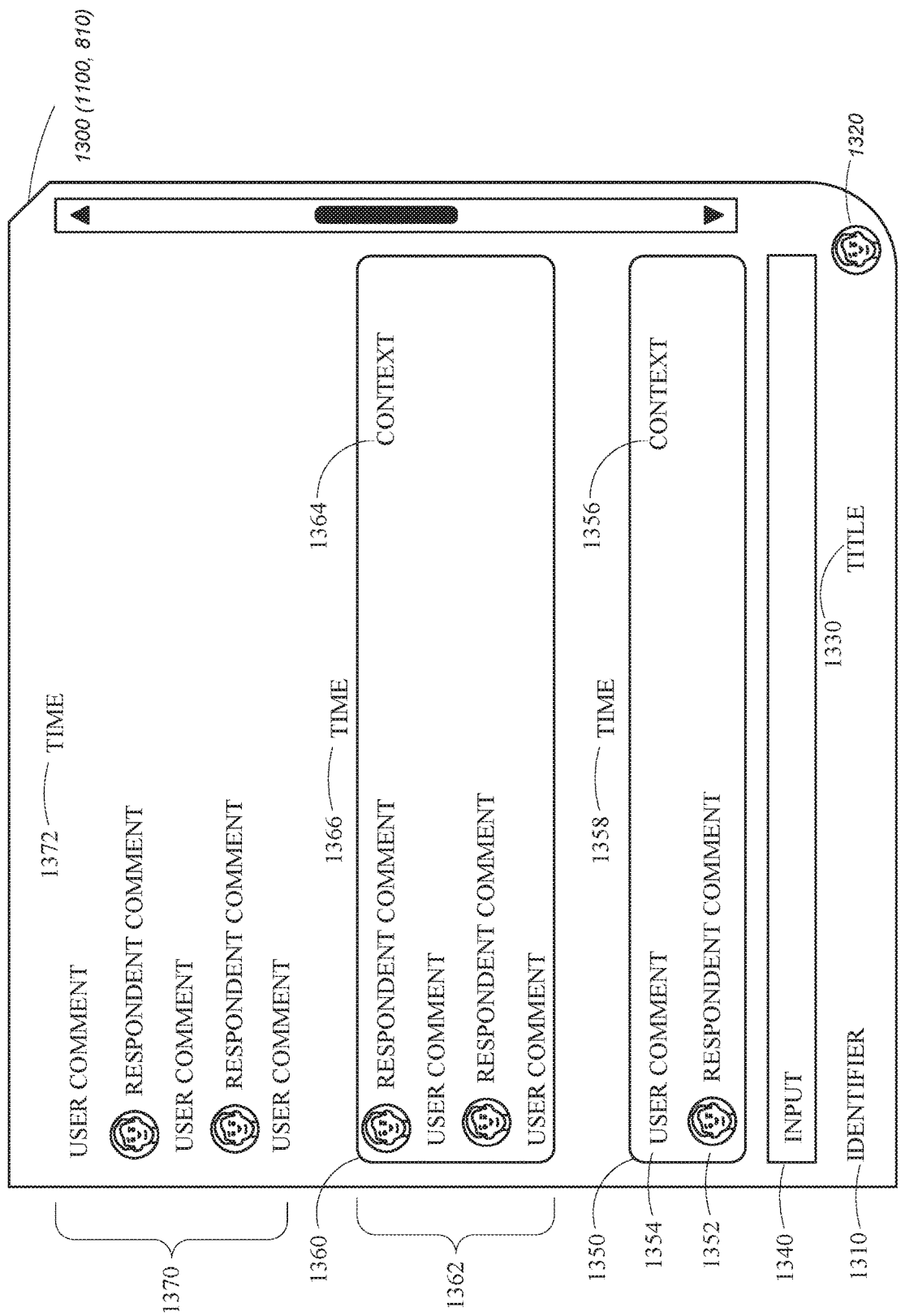
FIG. 13 is a pictorial diagram of another example of a chat card in accordance with this disclosure.

FIG. 13 is a pictorial diagram of another example of a chat card 1100, 1300 in accordance with this disclosure. A chat card 1300 may include multiple conversations, or multiple conversation segments, that are each related to a common criterion. For example, a chat card 1300 may include multiple conversations between a current user and a responding user. Although not expressly shown, the chat card 1300 may be implemented as a modal window, which may be displayed independently of a lane 800. In some applications, a chat card 1300 may include comments from multiple users. For example, a chat card 1300 may be associated with a task and may include comments from multiple users associated with the task.

For example, the chat card 1300 shown in FIG. 13 includes a conversation identifier 1310, an associated user identifier 1320, a title 1330, an input control 1340, and three conversation segments 1350, 1360, 1370. For example, the associated user identifier 1320 may represent a user named John, and the title 1330 may be "Chat history with John". Each conversation segment 1350, 1360, 1370 may represent a distinct portion of the conversation, such as a distinct time period. For example, the segment 1350 closest to the input control 1340 may represent a recent time period, and may include recent comments 1352, 1354 in temporal order or recency, from bottom to top. For example, the most recent comment 1352 may be a comment recorded within a recency threshold, such as one hour, of the current time, and recent conversation segment 1350 may include other comments 1354 from the conversation recorded within a continuity threshold, such as one hour, of the most recent comment 1352.

One or more of the conversation segments 1350, 1360, 1370 may be visually distinguishable from other conversation segments 1350, 1360, 1370. For example, as shown, the most recent conversation segment 1350 and the next most recent conversation segment 1360 are shown with a border. Although not shown in FIG. 13, a conversation segment may be visually distinguishable using any visually distinguishable feature. For example, a conversation segment may be presented with a background color that is different from a background color of the card. Additionally, any of the elements discussed herein may be nested within other elements. Thus, a card 810 at one level could serve as a task board 900 at another level, and such a card 810 can include lanes 800 of its own, which can include further lower-level cards 810. In such a scheme, visual distinguishability may be important for the visual ordering of information presented on an electronic display.

A conversation segment 1350, 1360, 1370 may include a context indicator 1356, 1364. For example, the most recent conversation segment 1350 may include comments associated with a task having the task identifier 'ID1234', and the context indicator 1356 may be "This conversation may be related to ID1234". In another example, the next most recent conversation segment 1360 may include comments associated with another task having the task identifier 'ID5678', and the context indicator 1364 may be "This conversation may be related to ID5678". In some applications, the context indicator 1356, 1364, or a portion thereof, such as the task ID portion, may include a control, such as hyperlink, associated with a conversation origin for the conversation, which may be the related task record.

A temporal indicator 1358, 1366, 1372 may be associated with a conversation segment 1350, 1360, 1370, (or any other element discussed herein) and may indicate a time, a date, or both, associated with the respective element, such as the conversation segment. The temporal indicator 1358 does not have to identify a precise time or be according to a fixed format. For example, the temporal indicator 1358 associated with the most recent conversation segment 1350, may be "Moments ago", the temporal indicator 1366 associated with the next most recent conversation segment 1360, may be "7 hours ago", and the temporal indicator 1372 associated with the least recent conversation segment 1370, may indicate a time, a date, or both, of the most recent comment from the least recent conversation segment 1370. In some applications, the temporal indicator 1358, 1366, 1372 may be visually distinguishable. For example, the temporal indicator 1358, 1366, 1372 may be presented in a font color that is different than other font colors in the card.

Although not shown expressly, in some implementations, a task card may include a chat portion. For example, a task card, such as the task card 700 shown in FIG. 7, may include a chat portion, such as the chat portion 1360 shown in FIG. 13.

Figure 14:
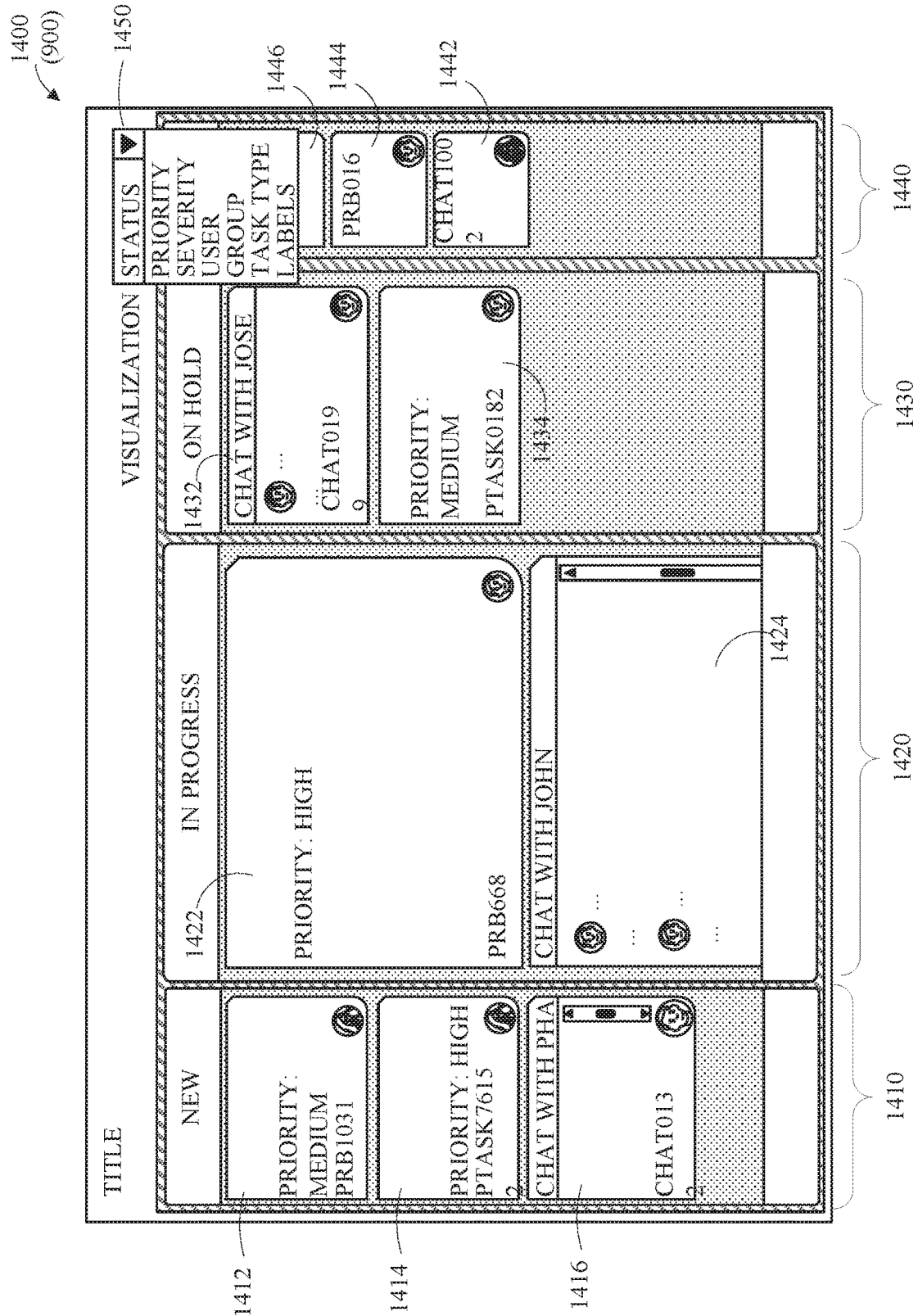
FIG. 14 is a pictorial diagram of an example of a status visualization of a visual task board in accordance with this disclosure.
Figure 15:
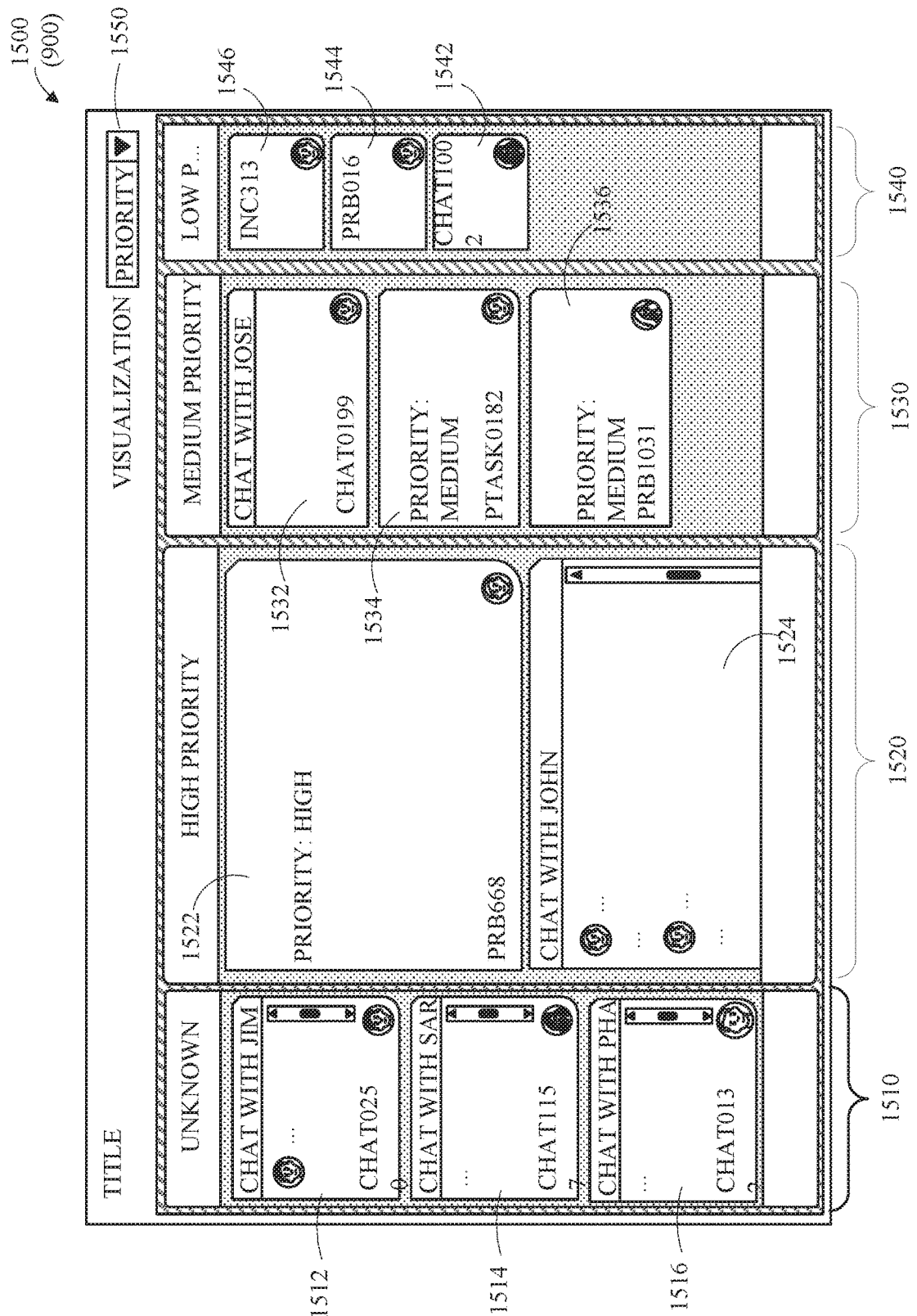
FIG. 15 is a pictorial diagram of an example of a priority visualization of the visual task board in accordance with this disclosure.

FIGS. 14-15 are pictorial diagrams of examples of visual task board visualizations as might be utilized in a problem resolution system in accordance with this disclosure. A visual task board may represent a defined information set 300 in accordance with multiple visualizations, perspectives, or views. Each visualization may represent the information set 300 based on a specified criterion, such as status, priority, severity, user, group, task type, labels, or any other element from the information set 300. For simplicity and clarity the examples shown in FIGS. 14-15 are based on an information set 300 that includes a first problem with the identifier 'PRB1031', a priority of 'Medium', and a status of 'New'; a second problem with the identifier 'PRB668', a priority of 'High', and a status of 'In Progress'; a third problem with the identifier 'PRB016', a priority of 'High', and status of 'Complete'; a first task with the identifier 'PTASK76152', a priority of 'High', and a status of 'New'; a second task with the identifier 'PTASK0182', a priority of 'Medium', and a status of 'On Hold'; a first chat with a user named 'Pham', a chat identifier 'CHAT0132', and a status of 'New'; a second chat with a user named 'John', a chat identifier 'CHAT0173', and a status of 'In Progress'; a third chat with a user named 'Jose', a chat identifier of 'CHAT0199', and a status of 'On Hold'; a fourth chat with a user named 'Chia', a chat identifier of 'CHAT1002', and a status of 'Complete'; a fifth chat with a user named 'Sara', a chat identifier of 'CHAT1157'; a sixth chat with a user named 'Jim', and a chat identifier of 'CHAT0250'; and an incident with the identifier 'INC313', a priority of 'Low', and a status of 'Complete'. The information set 300 does not indicate a priority for the chat with 'Pham', the chat with 'Jim', or the chat with 'Sara'.

FIG. 14 is a pictorial diagram of an example of a status visualization of a visual task board 900 in accordance with this disclosure. The status visualization of the visual task board 900, 1400 includes a first lane 1410 representing a 'New' status. The 'New' lane 1410 includes a first card 1412 that represents the problem with the identifier 'PRB1031', a second card 1414 that represents the task with the identifier 'PTASK76152', and a third card 1416 that represents the chat with the chat identifier 'CHAT0132'. The status visualization of the visual task board 1400 includes a second lane 1420 representing an 'In Progress' status. The 'In Progress' lane 1420 includes a first card 1422 that represents the problem with the identifier 'PRB668', and a second card 1424 that represents the chat with 'John'. The status visualization of the visual task board 1400 includes a third lane 1430 representing an 'On Hold' status. The 'On Hold' lane 1420 includes a first card 1432 that represents the chat that has the chat identifier of 'CHAT0199', and a second card 1434 that represents the task with the identifier 'PTASK0182'. The status visualization of the visual task board 1400 includes a fourth lane 1440 representing a 'Complete' status. The 'Complete' lane 1440 includes a first card 1442 that represents the that has the chat identifier of 'CHAT1002', a second card 1444 that represents the problem with the identifier 'PRB016', and a third card 1446. Cards for the chat with 'Jim' and the chat with 'Sara' are not shown in FIG. 14.

The visual task board may be revisualized to represent the information set 300 based on a different visualization criterion. For example, the visual task board may be revisualized in response to user input selecting a visualization criterion other than 'Status' from the visualization control 1450. In some applications, the visualization may be based on a definite or constrained visualization metric as shown, which may correspond with a guided task board. A constrained visualization metric may be a metric for which a set of available values is defined. Although not expressly shown, in some applications, the visualization may be based on an indefinite or unconstrained visualization metric, which may correspond with a flexible task board. For example, one or more of the records represented by a visual task board may include a description element, which may have any value, and the description element may be selected as the visualization metric for the visual task board. In some applications, a visual task board based on an unconstrained visualization metric may include a defined default set of lanes, such as a new lane, an in progress lane, and a complete lane, which may be customized by a user of the visual task board.

FIG. 15 shows a diagram of an example of a priority visualization of the visual task board 900 in accordance with this disclosure. In the priority visualization, the visual task board 900, 1500 for the information set 300 includes a first lane 1510 representing an 'Unknown' status. Cards that do not include an information element corresponding to the visualization criterion may be included in the 'Unknown' lane 1510. The 'Unknown' lane 1510 includes a first card 1512 that represents the chat that has the chat identifier 'CHAT0250', a second card 1514 that represents the chat that has the chat identifier 'CHAT1157', and a third card 1516 that represents the chat that has the chat identifier 'CHAT0132'. The priority visualization of the visual task board 1500 includes a second lane 1520 representing a high priority. The high priority lane 1520 includes a first card 1522 that represents the problem with the identifier 'PRB668', and a second card 1524 that represents the chat with 'John'. The priority visualization of the visual task board 1500 includes a third lane 1530 representing a medium priority. The medium priority lane 1520 includes a first card 1532 that represents the chat with 'Jose', a second card 1534 that represents the task with the identifier 'PTASK0182', and a third card 1536 that represents the problem with the identifier 'PRB1031'. The priority visualization of the visual task board 1500 includes a fourth lane 1540 representing a low priority. The low priority lane 1540 includes a first card 1542 that represents the chat that has the chat identifier of 'CHAT1002', a second card 1544 that represents the problem with the identifier 'PRB016', and a third card 1546 that represents the incident with the identifier 'INC313'.

A card 810 in a visual task board 900 may be moved from one lane 800 to another. For example, a card may be moved in response to user input dragging the card from one lane and dropping the card in another lane. For example, the card 1512 may be moved from the unknown priority lane 1510 to the high priority lane 1520 and the conversation records represented by the card 1512 may be updated to indicate that the conversation is a high priority conversation. In some applications, the visual task board system may prevent a card from changing priority and the card 1512 may not be dragged and dropped on another lane.

Although not shown in FIG. 15, in some applications, the information included in a card 810 may be based on the visualization metric. For example, the visualization metric may be status, as shown in FIG. 14, the priority information may be included in the cards 810 and the status information may be omitted from the cards, the visualization metric may be changed to priority, and the priority information may be omitted from the cards and the status information may be included in the cards.

Figure 16:
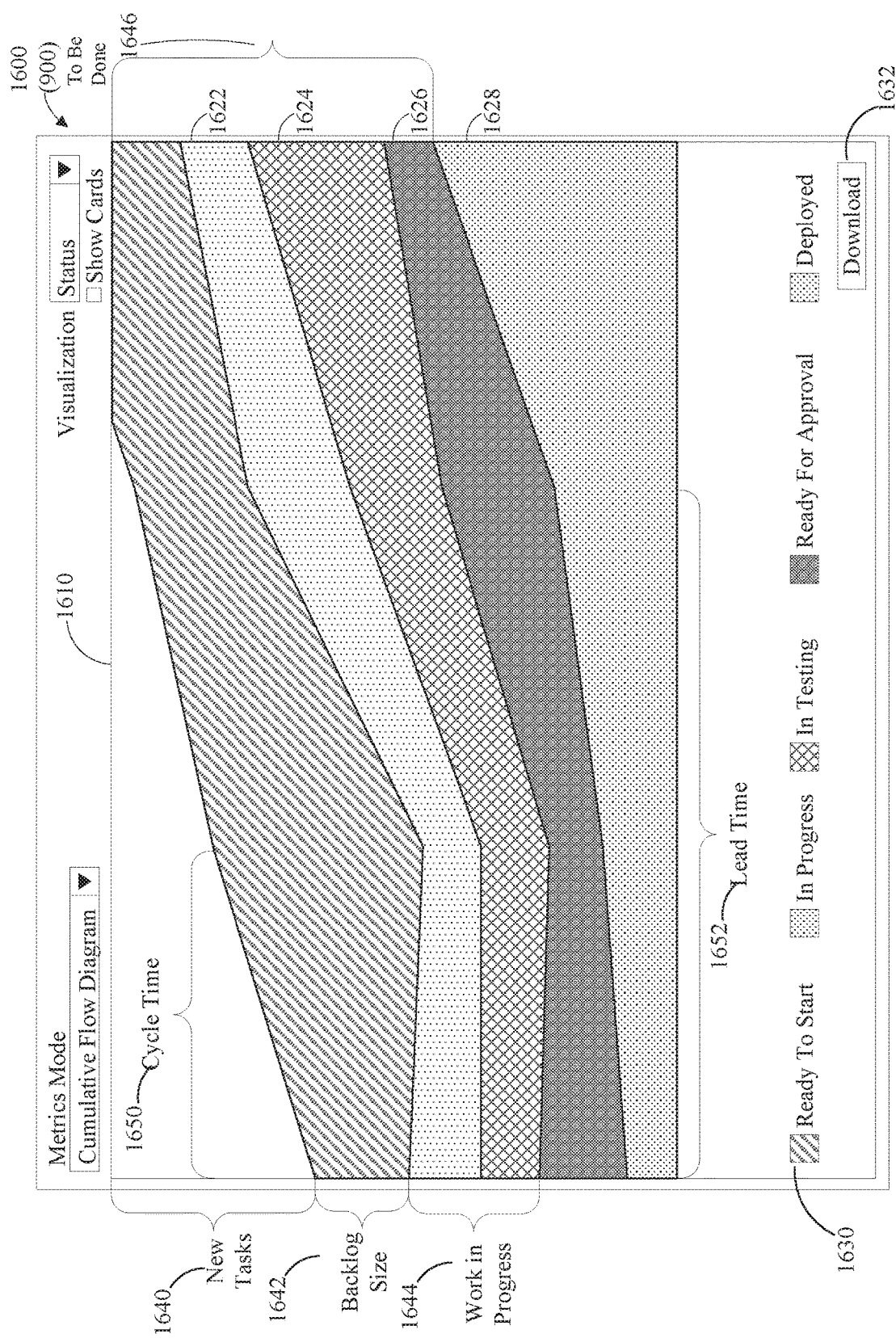
FIG. 16 is a pictorial diagram of an example of a visual task board including aggregate information visualization in accordance with this disclosure.

FIG. 16 is a pictorial diagram of an example of a visual task board 900, 1600 including aggregate information visualization in accordance with this disclosure. This visual task board 1600 may include a representation 1610 of an aggregation of the information from the information set 300 based on one or more aggregation metrics, such as the selected visualization metric. For example, FIG. 16 shows an example of a visual task board 1600 including a cumulative flow diagram 1610 based on status values over a defined time period. For simplicity and clarity, a visual task board including an aggregation graph or graph display region may be referred to herein as being in an aggregation mode or a metrics mode. Similarly, for a visual task board that does not include an aggregation graph, such as a visual task board for which an aggregation graph is not selected or for which a No Graph aggregation mode is selected, the aggregation mode designation may be omitted or the visual task board may be referred to as being in a detail mode.

An aggregation mode, or metrics mode, graph 1610 may include graph portions 1620, 1622, 1624, 1626, 1628 corresponding to each value of the identified aggregation metric. For example, as shown the cumulative flow diagram 1610 is based on status. The status metric may include a sequence of values, such as 'Ready To Start', 'In Testing', 'In Progress', 'Ready For Approval', and 'Deployed'. The cumulative flow metrics mode graph 1610 may include a portion 1620 corresponding to the 'Ready To Start' status, a portion 1622 corresponding to the 'In Progress' status, a portion 1624 corresponding to the 'In Testing' status, a portion 1626 corresponding to the 'Ready For Approval' status, and a portion 1628 corresponding to the 'Deployed' status.

The visual task board 1600 in metrics mode may include a legend 1630, which may describe the representation of each portion 1620, 1622, 1624, 1626, 1628. The visual task board 1600 in metrics mode may include a control 1632, which may initiate the transmission or storage of the representation shown in response to user input selecting the control. For example, a user may click the control 1632 to download the current graph.

Aggregate features of the information set 300 represented by the visual task board 1600 may be identified based on the aggregation mode graph 1610. For example, as shown, a magnitude 1640 of the bandwidth available for new tasks may be identified. A backlog size 1642 may be identified. A magnitude 1644 of work in progress, which may include the 'In Progress' status, the 'In Testing' status, and the 'Ready For Approval' status, may be identified. A magnitude 1646 of work remaining to be done may be identified, which may include the 'Ready To Start' status, the 'In Progress' status, the 'In Testing' status, and the 'Ready For Approval' status. A Cycle Time 1650 may be identified, which may indicate a magnitude of the time between the 'In Progress' status and the 'Ready For Approval' status. A Lead Time 1652 may be identified, which may indicate a magnitude of the time between the 'Ready To Start' status, which may correspond with the initial creation of the corresponding record, and the 'Deployed' status. Although the aggregate features 1640, 1642, 1644, 1646, 1650, 1652 are indicated at the sides of the metrics mode graph 1610 in FIG. 16, aggregate features may be identified at any point, or points, in the graph.

Figure 17:
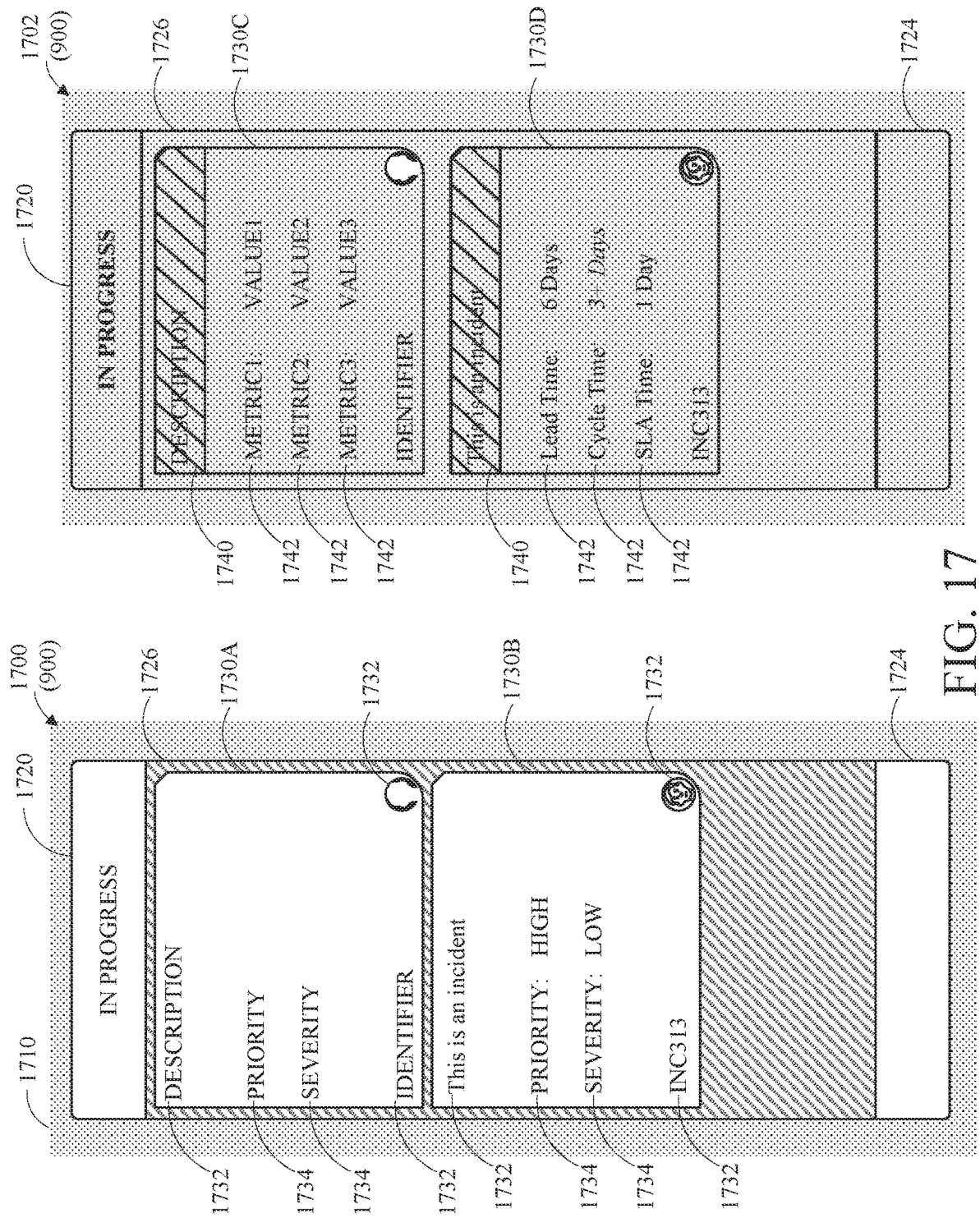
FIG. 17 is a pictorial diagram of examples of cards and lanes in a visual task board in detail mode and in aggregation mode in accordance with this disclosure.

FIG. 17 is a pictorial diagram of examples of cards 810 and lanes 800 in a visual task board 900 in detail mode and in aggregation mode in accordance with this disclosure. In the examples shown in FIG. 17, the visual task board 900 is shown using the Status visualization metric. An example of a portion 1700 of the visual task board 900 in detail mode and an example of a portion 1702 of the visual task board in an aggregation mode are shown.

The portion 1700 of the visual task board in detail mode includes a background 1710. The visual task board background 1710 is shown as speckled for clarity; however, any background may be used. The portion 1700 of the visual task board in detail mode includes an In Progress lane 1720, which includes a lane header 1722, a lane footer 1724, and a lane body 1722. The lane header 1722, the lane footer 1724, and the lane body 1726, may have an opaque background. The background of the lane body 1726 is shown using slanted lines over an opaque background for clarity. The portion 1700 of the visual task board in detail mode includes first card 1730A and a second card 1730B. A card 1730 in a visual task board in detail mode may have an opaque background. A card 1730 in a visual task board in detail mode may include identifying information elements 1732, which may be high priority information elements, such as a record identifier, a description, and an associated user identifier. A card 1730 in a visual task board in detail mode may include detail information elements 1734, which may have a lower priority than the identifying information elements 1732, such as priority, or a severity, or any other information element. The first card 1730A is shown using information element descriptions for simplicity. The second card 1730B is shown using examples of information element values for clarity. An information element may be included in a card using the information element name, or description, the information element value, or a combination of the information element name and the information element value. For example, in the second card 1730B, the identifying information elements 1732 are shown using information element values and the detail information elements 1734 are shown using a combination of the information element name and the information element value.

The portion 1702 of the visual task board in aggregation mode may be similar to the portion 1700 of the visual task board in detail mode except as described herein. The lane header 1722, the lane footer 1724, and the lane body 1726, may have a transparent, or partially transparent, background. The portion 1702 of the visual task board in aggregation mode includes first card 1730C and a second card 1730D. A card 1730 in a visual task board in aggregation mode may have a transparent, or partially transparent, background. A portion 1740 of a card 1730 in a visual task board in aggregation mode 1702, such as the portion 1740 proximate to the description, may have a transparent, or partially transparent, background, that may distinguish the portion 1740, the card 1730, or both, from the background of the lane 1720, the visual task board, or both. The background of the portion 1740 is shown using slanted lines over a transparent background for clarity. A card 1730 in a visual task board in aggregation mode may include aggregate information elements 1742, which may have a lower priority than identifying information elements. The first card 1730C in the portion 1702 of the visual task board in aggregation mode is shown using information element descriptions for simplicity. The second card 1730D in the portion 1702 of the visual task board in aggregation mode is shown using examples of information element names and values for clarity.

An aggregate information element 1742 may indicate a lead time, which may indicate a number of days since the card was created, or a number of days between when the record represented by the card was created and the card status was set to 'Deployed'. An aggregate information element 1744 may indicate a cycle time, which may indicate a number of days since the card status was set to the 'In Progress' status or a number of days between when the card status was set to the 'In Progress' status and when the card stats was set to the 'Ready For Approval' status. An aggregate information element 1746 may indicate a service level agreement (SLA) time, which may be a defined number of days. A number of days value may include an integer value, which may indicate a number of days.

A number of days value may include a potential growth indicator, such as the plus sign (+), which may indicate whether the number of days may increase. For example, as shown in FIG. 17, the Lead Time value is "6 Days", which indicates that the difference between the date the record represented by the card 1730D was created and the date the 'Deployed' status was set for the card 1730D is six days. In another example, the Cycle Time value is "3+ Days", which indicates that the difference between the date 'In Progress' status was set for the card 1730D and the current date for the visual task board is three days, and indicates that the 'Ready For Approval' status has not been set for the card 1730D. Alternatively, or additionally, a number of days value that may potentially grow may be indicated using another distinguishing display characteristic. For example, a number of days value that may potentially grow may be displayed using an italicized font.

An aggregate information element 1742 may be displayed using a display indication indicating whether the value is within a defined period. For example, a card 810 may represent a task, the task may be associated with a service level agreement, the service level agreement may indicate that tasks must be deployed within a defined number of days from creation, the lead time for a card may exceed the maximum specified by the service level agreement, and the aggregate information element 1742 for the card 810 may be displayed in a red font color.

Figure 18:
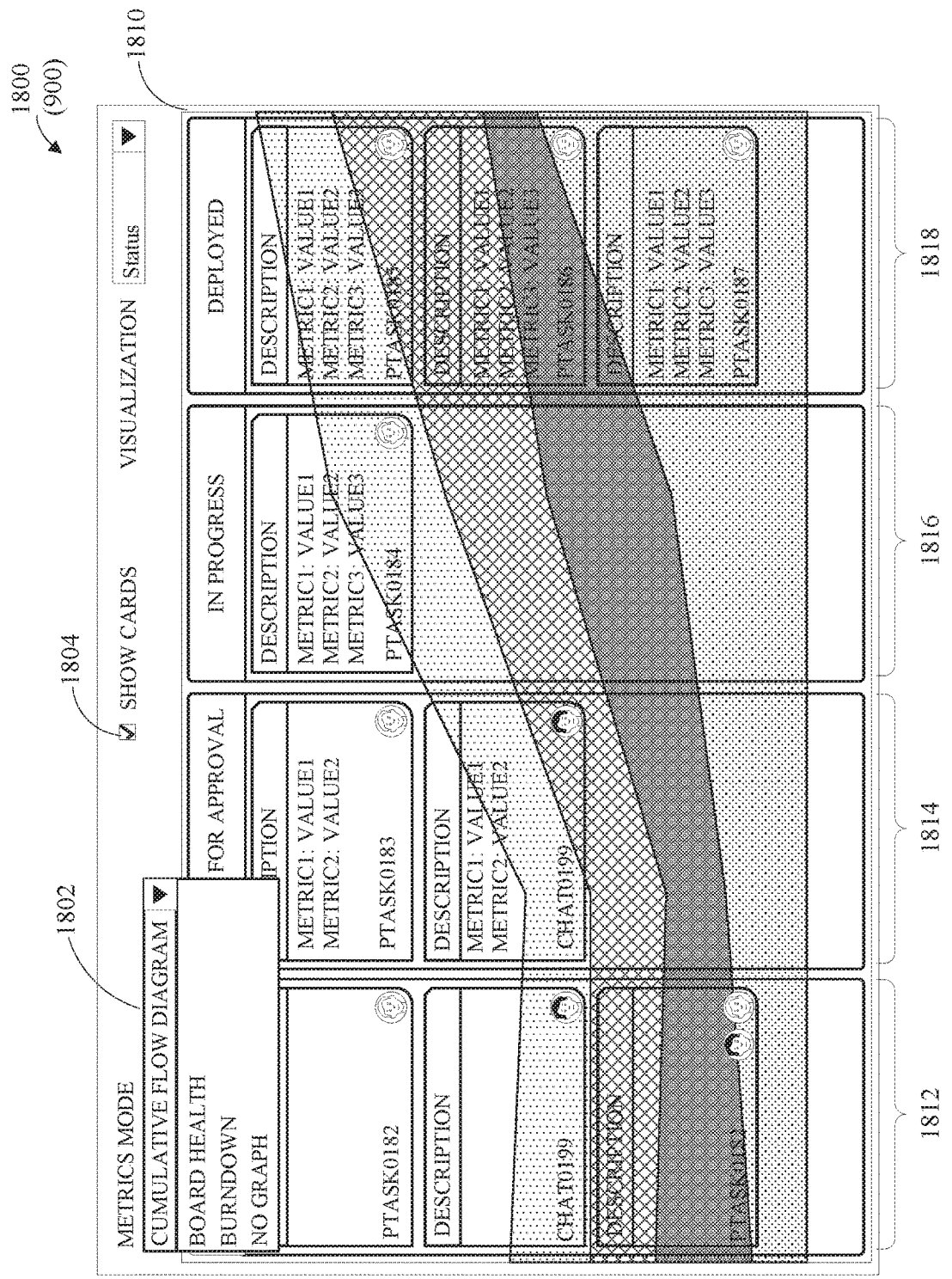
FIG. 18 is a pictorial diagram of an example of a visual task board including aggregate information visualization and superimposed/overlayed cards in accordance with this disclosure.

FIG. 18 is a pictorial diagram of an example of a visual task board 900, 1800 including aggregate information visualization with superimposed/overlaid cards in accordance with this disclosure. A metrics mode, or aggregate mode, graph 1810 may be generated in response to input, such as user input selecting a graph. For example, a visual task board 1800 may include a metrics mode control 1802, and metrics mode graph 1810 of the visual task board 1800 may be generated in response to user input selecting a metrics mode graph from the metrics mode control 1802. In some applications, lanes 1812, 1814, 1816, 1818, including cards, such as the lane 1702 shown in FIG. 17, may be included in the visual task board and may be superimposed over the metrics mode graph 1810 as shown. Overlaid or overlapped elements as defined herein can include lines, a symbol, color, shape modification, and such an overlap or overlay is defined to include these as well as any modification to a visual representation upon which it is provided.

Lanes 1812, 1814, 1816, 1818, which may include cards 810, may be included, as shown in FIG. 18, or omitted, as shown in FIG. 16, from the visual task board 1800 in response to input, such as user input. For example, the visual task board 1800 may include a Show Cards control 1804, and the cards may be included or omitted from the visual task board 1800 in response to user input toggling the Show Cards control 1804. For example, the Show Cards control 1804 may be checked, which may indicate an instruction to show the cards, and the lanes and cards may be included in the visual task board, or the Show Cards control 1804 may be unchecked, indicating an instruction to omit the cards, and the lanes and cards may be omitted from the visual task board. Although the lanes and cards are shown having a fully transparent background in FIG. 18, one or more portions of a lane, one or more portions of a card, or a combination thereof, may include a fully or partially opaque background.

The metrics mode graph 1810 may automatically update in response to a change in the information represented by the visual task board 1800. For example, a card 810 may be moved from the 'In Progress' lane 1816 to the 'Deployed' lane 1818, in response to user input, and the metrics mode graph 1810 may be automatically adjusted in response. In some applications, the visual task board 1800 may be scrolled horizontally to include one or more lanes not shown in the current display, and the metrics mode graph 1810 may be animated with a parallax effect in response to the scrolling.

Figure 19:
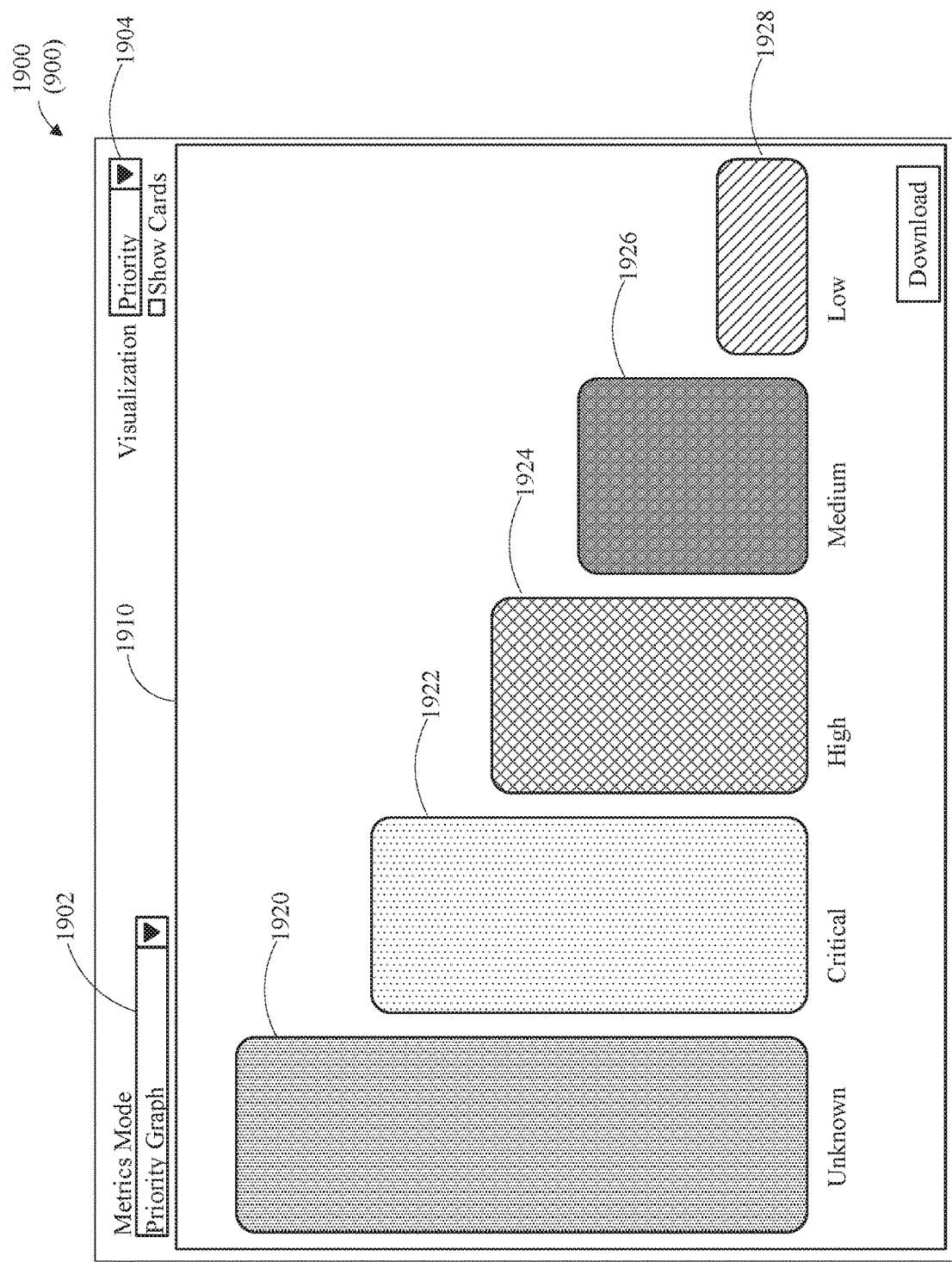
FIG. 19 is a pictorial diagram of an example of a visual task board including a priority metrics mode graph in accordance with this disclosure.

FIG. 19 is a pictorial diagram of an example of a visual task board 900, 1900 including a priority metrics mode graph in accordance with this disclosure. The priority graph 1910 may be similar to the cumulative flow metrics mode graph 1610 shown in FIG. 16, except as described herein. For simplicity, the visual task board 1900 shown in FIG. 19 includes a metrics mode graph control 1902, a visualization metric 1904, and a priority graph 1910. The priority graph 1910 may represent the information set 300 as a bar graph based on values of the priority metric, such as critical, high, medium, or low. The metrics mode graph control 1902 may be automatically updated in response to a change in the visualization metric 1904. For example, the visualization metric may change from Status, as shown in FIGS. 16-18, to Priority as shown in FIG. 19, and the metrics mode graph control 1902 may automatically update to include priority based graphs and omit status based graphs. Similarly, the metrics mode graph 1910 may automatically adjust to represent the information set 300 as a priority based graph, as shown.

A metrics mode graph, such as a priority graph, 1910 may include a representation 1920, 1922, 1924, 1926, 1928 of the number of cards 810 associated with each value of the visualization metric. For example, the priority graph 1910 shown includes a representation of the number of cards 810 having an unknown priority 1920, a representation of the number of cards 810 having a critical priority 1922, a representation of the number of cards 810 having a high priority 1924, a representation of the number of cards 810 having a medium priority 1926, and a representation of the number of cards 810 having a low priority 1928.

In some implementations, the visual task board 1900 may automatically update in response to input, such as user input selecting representation of a priority value 1920, 1922, 1924, 1926, 1928. For example, a user may double click, or drill down, on the indication of the high priority cards 1924, and the visual task board 1900 may update as shown in FIG. 20.

Figure 20:
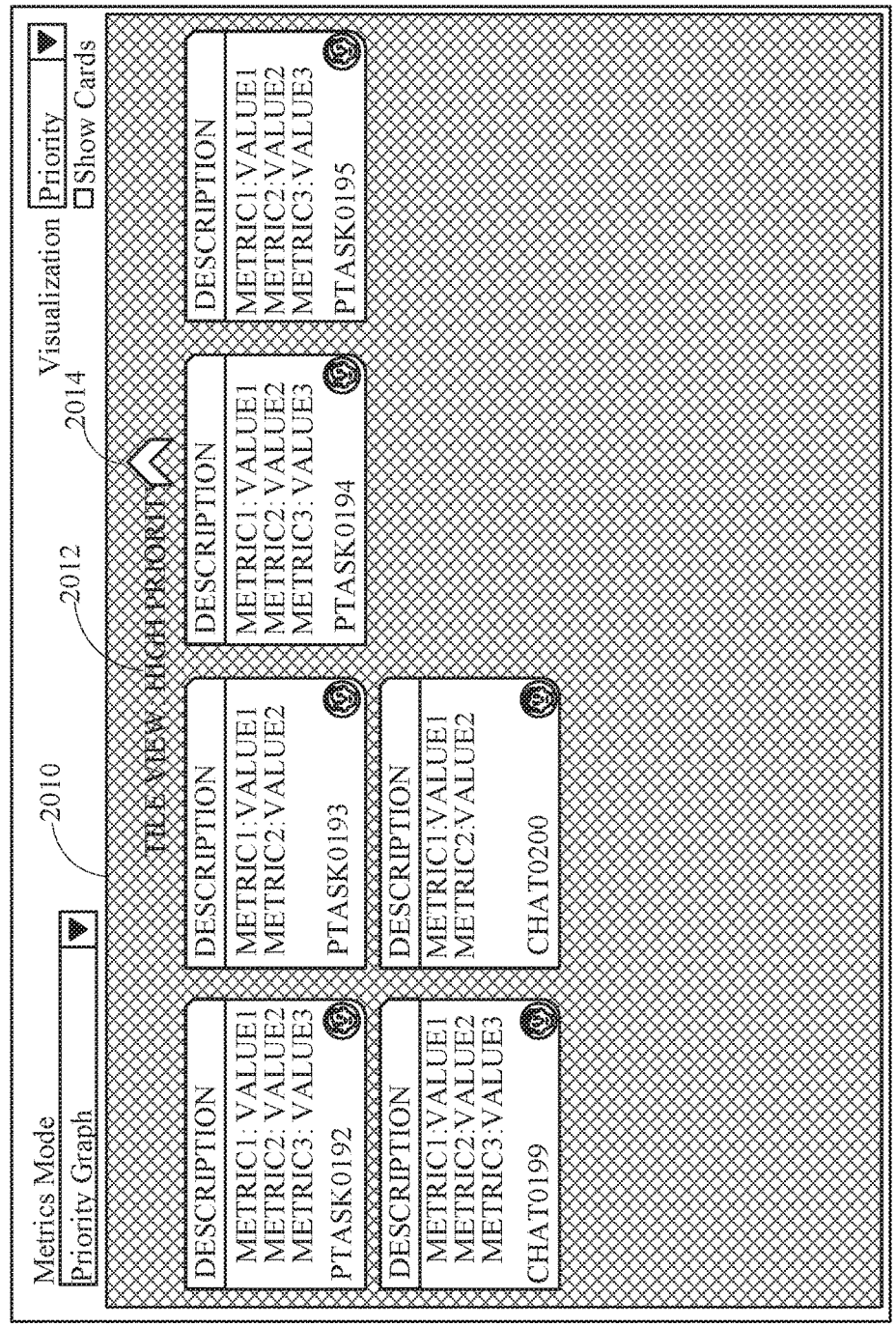
FIG. 20 is a pictorial diagram of an example of a metric value specific representation of the visual task board in accordance with this disclosure.

FIG. 20 is a pictorial diagram of an example of a metric value specific representation of the visual task board 900, 2000 in accordance with this disclosure. The metric value specific representation 2010 may include a background, or other visual indication, which may correspond to the background of the representation of the corresponding metric value in a priority graph, such as the priority graph 1900 shown in FIG. 19. For example, in the priority graph 1910 shown in FIG. 19 the portion 1924 representing the high priority records is shown using cross hatching, and the background of the metric value specific representation 2010 shown in FIG. 20 is shown using cross hatching for clarity, however, any distinguishing visual representation, such as color, may be used.

The metric value specific representation 2010 may include the cards 810 having the corresponding metric value, which may be similar to the cards shown in FIG. 18. For example, FIG. 20 shows the metric value specific representation 2010 for the high priority metric value, and the cards 810 included in the metric value specific representation 2010 may each represent high priority records, and may include information elements relevant to the information aggregation. The metric value specific representation 2010 may include a title 2012, which may indicate the metric shown. The metric value specific representation 2010 may include a control 2014. For example, the visual task board 1900 shown in FIG. 19 may be displayed in response to user input selecting the control 2014.

Figure 21:
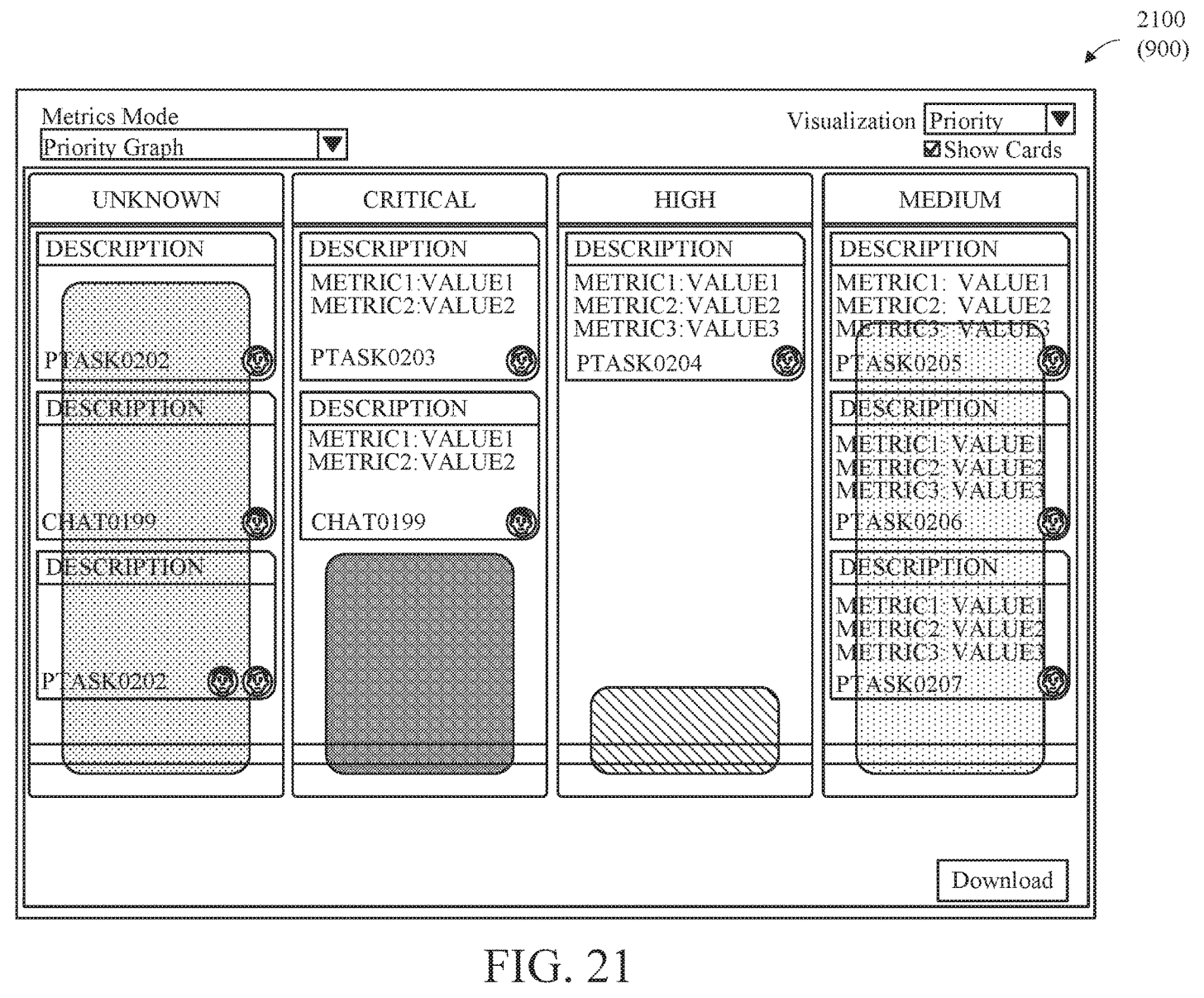

FIG. 21 is a pictorial diagram of an example of a visual task board 900, 2100 including a priority metrics mode graph and superimposed cards 810 in accordance with this disclosure. The visual task board 2100 may be similar to the visual task board 1800 shown in FIG. 18, except that the visual task board 2100 may include a priority graph, such as the priority graph 1910 shown in FIG. 19, and the lanes 800 and cards 810 may represent the information set 300 organized based on the priority visualization metric.

In some applications, the lane 800 corresponding to a priority visualization metric value may be superimposed over the portion of the priority graph representing the corresponding visualization metric value. For example, the unknown lane may be superimposed over the portion of the priority graph representing the records having the unknown priority, the critical lane may be superimposed over the portion of the priority graph representing the records having the critical priority, the high priority lane may be superimposed over the portion of the priority graph representing the records having the high priority, and the medium priority lane may be superimposed over the portion of the priority graph representing the records having the medium priority, as shown.

Figure 22:
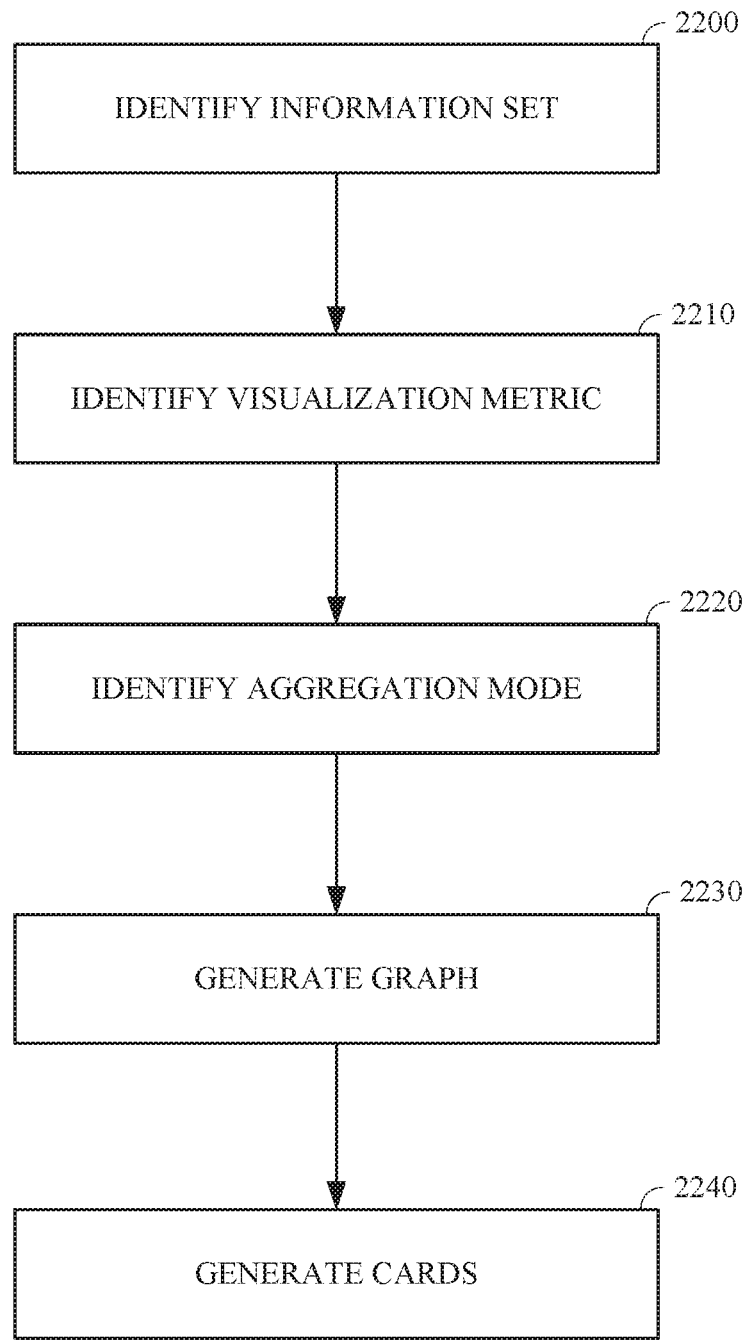
FIG. 22 is a flowchart of an example of a method of generating a visual task board in accordance with this disclosure.

FIG. 22 is a flowchart illustrating an algorithm of an example of a method of generating a visual task board in accordance with this disclosure. Generating a visual task board may be implemented by algorithms or software modules described herein, which contain instructions for running on a processor of a computing system, such as the cloud computing system 100 shown in FIG. 1. For example, generating a visual task board may be implemented on a server, such as one or more of the servers 122 shown in FIG. 1, a computing device, such as a client 112 shown in FIG. 1, or by a combination thereof communicating via a network, such as the network 130 shown in FIG. 1. Generating a visual task board may include identifying an information set 300 at 2200, identifying a visualization metric at 2210, identifying an aggregation mode at 2220, generating a graph at 2230, generating cards and lanes at 2240, or a combination thereof.

In some applications, an information set 300 may be identified at 2200. For example, identifying an information set 300 may be performed by an information set identifier module and include identifying a set of related information elements and records. Identifying an information set 300 may include creating a new visual task board 900 or selecting an existing visual task board 900, such as from a list of existing visual task boards.

In some applications, a visualization metric may be identified at 2210. Identifying a visualization metric may include identifying an information element from the information set 300 identified at 2200, which may be performed by an information element identifier module. For example, the information set 300 may include information elements organized as records, wherein each record corresponds with a single nucleus of operative fact, such as an event, a task, a problem, an issue, a conversation, a meeting, or the like, and identifying a visualization metric may include selecting an information element included in the information set 300. For example, the information set 300 may include task records that include task status information and task status may be identified as the visualization metric. The information set 300 may include records that omit the identified visualization metric information and a placeholder value, such as "Unknown," may be used as the value of the visualization metric for the records that omit the visualization metric. The visualization metric may be identified based in input, such as user input. For example, the visualization metric may be identified based on user input selecting the visualization metric from a list of available visualization metrics for the information set 300, from a control, such as the visualization control 1450 shown in FIG. 14. In some applications, the visualization metric may be identified based on a defined value, such as a default visualization metric or a last used visualization metric.

In some applications, an aggregation mode may be identified at 2220. Identifying an aggregation mode may be performed by an aggregation mode identifier module and include identifying the aggregation mode from a set of available aggregation modes associated with the visualization metric identified at 2210. For example, a control, such as the metrics mode control 1802 shown in FIG. 18, may include a list of available aggregation modes based on the visualization metric identified at 2210, and an aggregation mode may be identified in response to user input selecting an available aggregation mode from the control. In some implementations, the identified aggregation mode may indicate no aggregation or identifying the aggregation mode may be omitted.

In some applications, a graph may be generated at 2230. Generating a graph may be performed by a graph generation module and include aggregating the records from the information set 300 based on available values of the visualization metric identified at 2210. The information set 300 may include records that omit the identified visualization metric information and a placeholder value, such as 'Unknown', may be used as the value of the visualization metric for the records that omit the visualization metric. For example, the information set 300 may include task information, the visualization metric may be task priority, the information set 300 may include the available priority values of critical, high, medium, and low, the information set 300 may include records having task priority values of high and records having task priority values of low, the information set 300 may include records omitting task priority values, and generating the graph may include aggregating the records omitting task priority values as unknown records, identifying that there are no records with the critical priority or the medium priority, aggregating the records having the high priority, and aggregating the records having the low priority. Aggregating record may include determining a number, count, or cardinality of the aggregation of records having each respective visualization metric value. Generating the graph may include generating output for displaying a graph visually representing the aggregated information. In some implementations, generating the graph may include displaying the graph, or a portion thereof. In some implementations, generating the graph may be omitted, such as in response to identifying the aggregation mode at 2220 as no aggregation.

In some applications, cards 810 and lanes 800 may be generated at 2240. Generating cards 810 and lanes 800 may be performed by the card generation module and a lane generation module and include determining whether to generate cards and lanes. For example, the visual task board may include a show cards control, such as the Show Cards control 1804 shown in FIG. 18, and cards 810 and lanes 800 may be generated or omitted based on a value of the show cards control. For example, the show cards control may be checked, which may indicate an instruction to show the cards, and the lanes and cards may be generated, or the show cards control may be unchecked, indicating an instruction to omit the cards, and generating the lanes and cards may be omitted.

Generating lanes may include generating a lane 800 for each available value of the visualization metric. In some applications, generating lanes may include generating a lane 800 for a placeholder value of the visualization metric, such as the value 'Unknown'. For example, the information set may include task information, the visualization metric may be task priority, the information set may include the available priority values of critical, high, medium, and low, and generating the lanes may include generating a critical priority lane, a high priority lane, a medium priority lane, a low priority lane, an unknown priority lane, or a combination thereof.

Generating cards may include generating a card 810 representing each record in the information set utilizing a card generation module. For example, the information set may include task information, and generating cards may include generating a card for each task, which may be identified using a task identifier, which may be a unique value within the information set. In some applications, generating cards may include generating cards representing records included in the information set that omit the visualization metric. For example, generating the cards may include generating a chat card 1100 representing a conversation associated with the information set, or a meeting card representing a meeting associated with the information set.

Generating a card 810 may include determining information elements 308 to include in the card. Determining the information elements 308 to include in a card 810 may include identifying a set of candidate information elements. Identifying a set of candidate information elements may include determining whether to include aggregate information elements 308, such as the aggregation information elements 1826 shown in FIG. 18, in the candidate information elements. For example, an aggregation mode, other than no aggregation, may be identified at 2220, aggregation information elements may be generated, and the set of candidate information elements may include the aggregation information elements. A set of candidate information elements that includes aggregation information elements may include identifying information elements, which may be the highest priority information elements. For example, a set of candidate information elements that includes aggregation information elements may include an identifier information element identifying the record represented by the card, one or more user identifier information elements, a description information element, or a combination thereof. A set of candidate information elements that includes aggregation information elements may omit detail information elements, which may be lower priority information elements, such as a priority information element, a severity information element, a creation date information element, attachment information elements, comments information elements, conversation information elements, meeting information elements, or the like. In another example, aggregation at 2220 and graph generation at 2230 may be omitted, or the no graph mode may be identified at 2220, generating aggregate information elements may be omitted, and the information elements from the information set may be included in the set of candidate information elements.

Generating a card 810 may include identifying an amount of space, which may include horizontal space, vertical space, or both, such as a number of contiguous pixels, available in the card. The amount of available space for a card 810 may be based on a height of the card, which may be a defined (predefined prior to execution, or dynamically defined while the system is executing) value, such as value input by a user (or dynamically calculated based on other run-time criteria) or a default (predefined) value, a width of the lane 800 including the card 810, which may be a defined value (as discussed above), such as value input by a user or a default value, or a combination of height information and width information. The card 810 or the card display region may be combined with a lane 800 or lane display region selected from a plurality of lane regions in a combining module.

Generating a card 810 may include identifying an amount of space, which may include horizontal space, vertical space, or both, such as a number of contiguous pixels, for displaying each information element 308 from the set of candidate information elements. For example, generating a card may include identifying a font, font face, font size, image or icon size, or other related information for displaying one or more of the information elements, and may include identifying a number of horizontal pixels, vertical pixels, or both for rendering the characters or symbols of the information element, which may include a name of the information element, a value of the information element, or both. In addition to pixel-based calculations, actual size-based calculations (e.g., in inches, millimeters, etc.) can be used to target particular screen sizes for specific types of devices when their respective resolutions are known. In this way, to some extent, intelligent decisions can be made based on specific device types. For example, a complex visual task board 900 would preferably not be used in a smartphone device, since the display is too small to effectively render the necessary detail. In some applications, determining whether to include an information element in a card may include identifying a display priority associated with the information element for the visual task board 900, and including information elements 308 in the card based on available card space and display priority.

Generating the cards 810 and lanes 800 may include generating output for displaying the cards 810 and lanes 800 on a display of a device. In some implementations, generating the cards and lanes output data may be performed by an output generation module. An output module may be provided that includes transmitting the output for display or storing the output in a memory for use in displaying the cards 810 and lanes 800, or a portion thereof, on the display device. In some applications, generating the output for displaying the cards and lanes, or displaying the cards 810 and lanes 800, may include superimposing the cards 810 and lanes 800 over the graph as shown in FIGS. 17 and 20. For example, the cards and lanes may be displayed with opaque, or partially opaque, borders and a transparent background. In some applications, one or more portions of a card, such as a portion proximate to the description information element, may be displayed with a partially opaque background.

All or a portion of implementations of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The embodiments herein may be described in terms of functional block components and various processing steps. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional implementations may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any implementation or design described herein as "example" is not necessarily to be construed as preferred or advantageous over other implementations or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The particular implementations shown and described herein are illustrative examples of the invention and are not intended to otherwise limit the scope of the invention in any way. For the sake of brevity, conventional electronics, control systems, software development and other functional implementations of the systems (and components of the individual operating components of the systems) may not be described in detail. Furthermore, the connecting lines, or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or example language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for operating a window region of a graphical user interface in an aggregation mode, comprising:
   a processor configured to execute instructions stored in a memory, the instructions comprising:
      an information set identifier module configured to identify a visual task board information set structured in the memory that comprises a plurality of records, wherein each record of the plurality of records comprises at least one information element of a plurality of information elements from the visual task board information set;
      an information element identifier module configured to identify an information element of the plurality of information elements as a first visualization metric for output on a display of the graphical user interface;
      a lane generation module configured to generate a first plurality of vertical lane display regions of a graphical user interface window structured as lanes based on the first visualization metric, wherein the first visualization metric comprises a task priority metric and wherein the first plurality of vertical lane display regions are ordered based on the task priority metric, and wherein a width of each vertical lane display region of the first plurality of vertical lane display regions is based at least in part on the task priority metric;
      a card generation module configured to generate a respective card display region for each of the first plurality of vertical lane display regions of the graphical user interface window, wherein each card display region comprises at least one card representing at least one respective record of the plurality of records;
      a combining module configured to combine each card display region within its respective vertical lane display region of the first plurality of vertical lane display regions;
      an output generation module configured to generate an output for display in the graphical user interface window, wherein the output comprises the first plurality of vertical lane display regions with their respective card display regions; and
      an output module configured to transmit the output via a graphical user interface output interface or store the output in the memory.

2. The apparatus of claim 1, wherein the instructions comprise:
   a first visualization metric module that identifies a default information element as the first visualization metric.

3. The apparatus of claim 1, wherein the instructions comprise:
   a first visualization metric module that identifies the first visualization metric in response to user input received at a user input interface via which the user input is provided to the processor.

4. The apparatus of claim 1, comprising:
   a user input interface via which a user input is provided to the processor, wherein the instructions comprise a first aggregation mode module that identifies the first aggregation mode in response to user input provided at the user input interface.

5. The apparatus of claim 1, wherein each information element of the plurality of information elements comprises an information element name and an information element value.

6. The apparatus of claim 1, wherein the instructions comprise an aggregation mode identifier module configured to identify a first aggregation mode based on the first visualization metric, a graph generation module configured to generate a first graph display region based on the first aggregation mode for output on a display of the graphical user interface, and wherein the output generation module is further configured to:
add the first graph display region to the output; and
add the first plurality of vertical lane display regions to the output, such that the first plurality of vertical lane display regions and the respective card display regions are overlaid on the first graph display region.

7. The apparatus of claim 6, wherein:
the graph generation module is configured to generate a second graph display region based on a second aggregation mode in response to receiving information at the user input interface indicating user input selecting the second aggregation mode;
the output generation module is configured to generate an updated output for display, the updated output omitting the first graph display region and including the second graph display region; and
the output module is configured to transmit via the graphical user interface output interface or store in the memory the updated output.

8. The apparatus of claim 6, wherein:
the aggregation mode identifier module is configured to identify a second aggregation mode in response to receiving information indicating user input selecting a second visualization metric at a user input interface via which the user input is provided to the processor;
the graph generation module is configured to generate a second graph display region based on the second aggregation mode;
the lane generation module is configured to generate a second plurality of vertical lane display regions based on the second visualization metric;
the card generation module is configured to generate an additional respective card display region for each of the second plurality of vertical lane display regions, wherein each additional card display region comprises at least one respective record of the plurality of records;
the combining module is configured to include each additional card display region in its respective vertical lane display region of the second plurality of vertical lane display regions;
the output generation module is configured to generate an updated output for display on the display device, the updated output omitting the first graph display region and the first plurality of vertical lane display region, and comprises the second plurality of vertical lane display regions with their respective card display regions; and
the output module is configured to transmit via the graphical user interface output interface or store in the memory the updated output.

9. The apparatus of claim 6, comprising:
a user input interface via which a user input is provided to the processor;
a card movement module configured to receive information indicating user input at the user input interface related to moving a first card display region from a first vertical lane display region of the first plurality of vertical lane display regions to a second vertical lane display region of the first plurality of vertical lane display regions, wherein:
the graph generation module is configured to generate an updated first graph in response to the user input;
the output generation module is configured to generate an updated output for display, the updated output omitting the first graph display region and including the updated first graph display region; and
the output module is configured to transmit via the graphical user interface output interface or store in the memory the updated output.

10. The apparatus of claim 1, wherein each of the card display regions relate to a task card, a problem card, an incident card, an event card, a chat card, or a meeting card, or any combination thereof.

11. The apparatus of claim 1, wherein the task priority metric comprises a low priority associated with a first vertical lane display region of the first plurality of vertical lane display regions, a medium priority associated with a second vertical lane display region of the first plurality of vertical lane display regions, and a high priority associated with a third vertical lane display region of the first plurality of vertical lane display regions.

12. The apparatus of claim 11, wherein the task priority metric comprises an unknown priority associated with a fourth vertical lane display region of the first plurality of vertical lane display regions.

13. The apparatus of claim 1, wherein the first plurality of vertical lane display regions comprises a first vertical lane display region comprising a low priority and a first width, a second vertical lane display region comprising a medium priority and a second width, and a third vertical lane display region comprising a high priority and a third width, wherein the third width is greater than the second width, and wherein the second width is greater than the first width.

14. The apparatus of claim 13, wherein a width of each card display region matches with the width of a respective vertical lane display region of the first plurality of vertical lane display regions.

15. The apparatus of claim 8, wherein the second visualization metric comprises a status metric, a severity metric, a user metric, a group metric, a task type metric, or a labels metric, or any combination thereof.

16. An apparatus for operating a window region of a graphical user interface in an aggregation mode, comprising:
a processor configured to execute instructions stored in a memory to:
identify a visual task board information set that comprises a plurality of records, wherein each record comprises at least one information element of a plurality of information elements from the visual task board information set;
identify an information element of the plurality of information elements as a visualization metric, wherein a plurality of available visualization metric values is associated with the visualization metric, wherein the visualization metric values comprise a task priority metric;

identify an aggregation mode based on the visualization metric;

generate a graph based on the aggregation mode, wherein the graph comprises a plurality of graph portions, wherein each graph portion represents a respective available visualization metric value of the plurality of available visualization metric values;

generate a plurality of vertical lanes based on the visualization metric, wherein each vertical lane of the plurality of vertical lanes corresponds with a respective available visualization metric value of the plurality of available visualization metric values, wherein generating each vertical lane of the plurality of vertical lanes comprises generating a plurality of cards based on the visual task board information set, wherein each card of the plurality of cards represents a record of the plurality of records that comprises an information element that has a value that corresponds with the respective available visualization metric value that corresponds with the vertical lane, wherein the plurality of vertical lanes are ordered based on the task priority metric, and wherein a width of each vertical lane of the first plurality of vertical lanes is based at least in part on the task priority metric; and output for display a representation of the visual task board information set that comprises the plurality of vertical lanes overlaid on the graph.

17. The apparatus of claim 16, wherein the task priority metric comprises a low priority associated with a first vertical lane of the plurality of vertical lanes, a medium priority associated with a second vertical lane of the plurality of vertical lanes, and a high priority associated with a third vertical lane of the plurality of vertical lanes.

18. The apparatus of claim 17, wherein the task priority metric comprises an unknown priority associated with a fourth vertical lane of the plurality of vertical lanes.

19. The apparatus of claim 16, wherein the plurality of vertical lanes comprises a first vertical lane comprising a low priority and a first width, a second vertical lane comprising a medium priority and a second width, and a third vertical lane comprising a high priority and a third width, wherein the third width is greater than the second width, and wherein the second width is greater than the first width.

20. The apparatus of claim 19, wherein a width of each card of the plurality of cards matches with the width of a respective vertical lane of the plurality of vertical lanes.

21. The apparatus of claim 16, wherein the visualization metric values comprise a status metric, a severity metric, a user metric, a group metric, a task type metric, or a labels metric, or any combination thereof.

22. A computer-implemented method for operating a window region of a graphical user interface in an aggregation mode, comprising utilizing a processor for:

identifying a visual task board information set structured in a memory that comprises a plurality of records, wherein each record comprises at least one information element of a plurality of information elements from the visual task board information set;

identifying an information element of the plurality of information elements as a first visualization metric;

generating a first plurality of vertical lane display regions of a graphical user interface window structured as lanes based on the first visualization metric, wherein the first visualization metric comprises a task priority metric, wherein the first plurality of vertical lane display regions are ordered based on the task priority metric, and wherein a width of each vertical lane of the first plurality of vertical lanes is based at least in part on the task priority metric;

generating a respective card display region for each of the first plurality of vertical lane display regions of the graphical user interface window, wherein each card display region comprises at least one card representing at least one respective record of the plurality of records;

including each card display region in its respective vertical lane display region of the first plurality of vertical lane display regions;

generating, by the processor in response to instructions stored in a non-transitory computer readable medium, an output for display, wherein the output comprises the first plurality of vertical lane display regions with their respective card display regions; and transmitting the output via a graphical user interface output interface or storing the output in the memory.

23. The method of claim 22, comprising:

identifying a first aggregation mode based on the first visualization metric; and generating a first graph display region based on the first aggregation mode for output on a display of the graphical user interface, and wherein generating the output comprises:

including the first graph display region in the output; and including the first plurality of vertical lane display regions in the output, such that the first plurality of vertical lane display regions and the respective card display region are overlaid on the first graph display region.

24. The method of claim 23, comprising:

generating a second graph display region based on a second aggregation mode in response to receiving information indicating user input received at a user input interface selecting the second aggregation mode;

generating an updated output for the display, the updated output providing the second graph display region instead of the first graph display region; and transmitting via the graphical user interface output interface or storing in the memory the updated output.

25. The method of claim 23, comprising utilizing the processor for:

identifying a second aggregation mode in response to receiving at a user input interface information indicating a user input for a second visualization metric;

generating a second graph display region based on the second aggregation mode;

generating a second plurality of vertical lane display regions based on the second visualization metric;

generating an additional respective card display region for each of the second plurality of vertical lane display regions, wherein each additional card display region comprises at least one respective record of the plurality of records;

including each additional card display region in its respective vertical lane display region of the second plurality of vertical lane display regions;

generating an updated output for display, the updated output comprising the second plurality of vertical lane display regions with their additional card display regions in place of the first graph display region and the first plurality of vertical lane display regions; and transmitting via the graphical user interface output interface or storing in the memory the updated output.

26. The method of claim 22, comprising:
- receiving at a user input interface information indicating user input for moving a first card display region from a first vertical lane display region of the first plurality of vertical lane display regions to a second vertical lane display region of the first plurality of vertical lane display regions;
- generating an updated first graph display region in response to the input;
- generating an updated output for display, the updated output that includes the updated first graph display region in place of the first graph display region; and
- transmitting via the graphical user interface output interface or storing in the memory the updated output.

27. The method of claim 22, wherein each card display region represents a task card, a problem card, an incident card, an event card, a chat card, or a meeting card, or any combination thereof.

28. The method of claim 22, wherein the task priority metric comprises a low priority associated with a first vertical lane display region of the first plurality of vertical lane display regions, a medium priority associated with a second vertical lane display region of the first plurality of vertical lane display regions, and a high priority associated with a third vertical lane display region of the first plurality of vertical lane display regions.

29. The method of claim 28, wherein the task priority metric comprises an unknown priority associated with a fourth vertical lane display region of the first plurality of vertical lane display regions.

30. The method of claim 22, wherein the first plurality of vertical lane display regions comprises a first vertical lane display region comprising a low priority and a first width, a second vertical lane display region comprising a medium priority and a second width, and a third vertical lane display region comprising a high priority and a third width, wherein the third width is greater than the second width, and wherein the second width is greater than the first width.

31. The method of claim 30, wherein a width of each card display region matches with the width of a respective vertical lane display region of the first plurality of vertical lane display regions.

32. The method of claim 25, wherein the second visualization metric comprises a status metric, a severity metric, a user metric, a group metric, a task type metric, or a labels metric, or any combination thereof.

* * * * *